United States Patent
Lee et al.

(10) Patent No.: US 11,662,770 B2
(45) Date of Patent: May 30, 2023

(54) FOLDABLE ELECTRONIC DEVICE AND OPERATION METHOD THEREOF

(71) Applicant: SAMSUNG ELECTRONICS CO., LTD., Suwon-si (KR)

(72) Inventors: Kyungsoo Lee, Yongin-si (KR); Hyunsang Park, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 212 days.

(21) Appl. No.: 17/021,254

(22) Filed: Sep. 15, 2020

(65) Prior Publication Data

US 2021/0173438 A1 Jun. 10, 2021

(30) Foreign Application Priority Data

Dec. 5, 2019 (KR) .......................... 10-2019-0160894

(51) Int. Cl.
*G06F 1/16* (2006.01)
*G09G 3/20* (2006.01)

(52) U.S. Cl.
CPC .......... *G06F 1/1616* (2013.01); *G06F 1/1681* (2013.01); *G09G 3/2092* (2013.01)

(58) Field of Classification Search
None
See application file for complete search history.

(56) References Cited

U.S. PATENT DOCUMENTS

| | | | |
|---|---|---|---|
| 9,335,793 B2 * | 5/2016 | Rothkopf | G06F 3/04883 |
| 9,535,522 B2 | 1/2017 | Ahn | |
| 9,923,156 B2 | 3/2018 | Jeong | |
| 10,319,291 B2 | 6/2019 | Ikeda et al. | |
| 10,375,839 B2 | 8/2019 | Jung et al. | |
| 10,480,225 B1 * | 11/2019 | Hsu | E05D 3/12 |
| 10,501,973 B2 * | 12/2019 | Määttä | G06F 1/1681 |

(Continued)

FOREIGN PATENT DOCUMENTS

| | | |
|---|---|---|
| KR | 10-2017-0026747 | 3/2017 |
| KR | 10-1988964 | 6/2019 |
| KR | 10-1988966 | 9/2019 |

OTHER PUBLICATIONS https://www.samsung.com/global/galaxy/galaxy-fold/.
https://www.trustedreviews.com/news/samsung-galaxy-fold-vshuawei-mate-x-3664259.
https://www.helloprint.co.uk/blog/folding-options/.

*Primary Examiner* — Anthony Q Edwards
*Assistant Examiner* — Rashen E Morrison
(74) *Attorney, Agent, or Firm* — F. Chau & Associates, LLC

(57) ABSTRACT

A foldable electronic device includes a first sub-device, a second sub-device, a first hinge connected with the first and second sub-devices, and a single display panel coupled to the first and second sub-devices; where the single display panel includes a main area formed on inner surfaces of the first and second sub-devices, a cover area formed on a first outer surface of the first sub-device, and a round-edge area placed on a first side surface of the first sub-device, and configured to connect the main area and the cover area; where, in a folded state of the foldable electronic device, first information is displayed through the cover area or the round-edge area; and, in an unfolded state of the foldable electronic device, second information is displayed through the main area or the round-edge area.

20 Claims, 22 Drawing Sheets

(56) References Cited

U.S. PATENT DOCUMENTS

| | | | |
|---|---|---|---|
| 10,514,879 B2 | 12/2019 | Jung | |
| 10,613,586 B2* | 4/2020 | Yamazaki | H05B 33/02 |
| 10,732,677 B2* | 8/2020 | Gopalan | H04M 1/02 |
| 10,775,852 B2* | 9/2020 | Kim | G06F 1/1681 |
| 10,866,694 B2* | 12/2020 | Kim | G06F 1/1647 |
| 11,099,605 B2* | 8/2021 | Knoppert | G06F 1/1632 |
| 2009/0021668 A1 | 1/2009 | Chen | |
| 2010/0201604 A1* | 8/2010 | Kee | G06F 1/1616 |
| | | | 345/1.3 |
| 2018/0102096 A1 | 4/2018 | Lee et al. | |
| 2018/0110139 A1* | 4/2018 | Seo | G06F 1/1681 |
| 2018/0166842 A1* | 6/2018 | Siddiqui | F16C 11/04 |
| 2020/0371563 A1* | 11/2020 | Collins | H05K 7/16 |

\* cited by examiner

FOLDABLE ELECTRONIC DEVICE AND OPERATION METHOD THEREOF

CROSS-REFERENCE

This application claims priority under 35 U.S.C. § 119 to Korean Patent Application No. 10-2019-0160894 filed on Dec. 5, 2019, in the Korean Intellectual Property Office, the disclosure of which is incorporated by reference herein in its entirety.

FIELD

Embodiments of the inventive concept described herein relate to an electronic device, and more particularly, relate to a foldable electronic device and an operating method thereof.

DISCUSSION OF RELATED ART

Mobile devices such as a smartphone and a tablet personal computer (PC) may provide various features to a user. In general, the smartphone offers increased portability to the user but provides a relatively smaller screen size. In contrast, the tablet PC provides a relatively larger screen size, but with decreased portability.

SUMMARY

Embodiments of the inventive concept provide a foldable electronic device and an operating method thereof. Exemplary embodiment foldable electronic devices may be configured to provide both a relatively large screen and ease of portability to a user. The foldable electronic devices may provide the ease of portability in a folded or closed state, and may provide the relatively large screen in an unfolded or open state.

According to an exemplary embodiment, a foldable electronic device comprises: a first sub-device; a second sub-device; a first hinge configured to connect the first and second sub-devices; and a single display panel coupled to the first and second sub-devices, including a main area formed on a first inner surface of the first sub-device and a second inner surface of the second sub-device, a cover area formed on a first outer surface of the first sub-device which faces away from the first inner surface, and an edge area placed on a first side surface of the first sub-device, and configured to connect the main area and the cover area, wherein, in a folded state in which the first and second sub-devices are disposed through the first hinge such that the first and second inner surfaces face each other, first information is displayed through the cover area or the edge area, and wherein, in an unfolded state in which the first and second sub-devices are disposed through the first hinge such that the first and second inner surfaces are placed on the same plane, second information is displayed through the main area or the edge area.

According to an exemplary embodiment, a foldable electronic device of an in-folding type includes a system-on-chip, a single display panel, and a display driver circuit configured to control the single display panel, and the single display panel includes a main area which is formed on a first plane when the foldable electronic device is in an unfolded state, a cover area which is formed to overlap at least a portion of the main area on the first plane and is formed to be exposed to an outside when the foldable electronic device is in a folded state, and a round-edge area which is placed between the cover area and the main area. The display driver circuit controls the cover area and the main area independently and respectively under control of the system-on-chip.

According to an exemplary embodiment, an operating method of a foldable electronic device which includes a single display panel having a cover area, a main area, and an edge area, comprises: selecting one of a plurality of display modes based on at least one of initial settings or received user settings; displaying information on the single display panel, based on the selected display mode, through at least one of the cover area or the edge area when the foldable electronic device is in a folded state; and displaying information on the single display panel, based on the selected display mode, through at least one of the main area or the round-edge area when the foldable electronic device is in an unfolded state, wherein the cover area indicates an area of the single display panel which is formed on an outer surface of the foldable electronic device and is exposed to an outside environment in the folded state, wherein the main area indicates an area of the single display panel which is formed on a plurality of inner surfaces of the foldable electronic device and forms a first plane in the unfolded state, and wherein the edge area indicates an area of the single display panel which is formed on at least one side surface of the foldable electronic device and is connected with the cover area and the main area.

According to an exemplary embodiment, a foldable electronic device comprises: a plurality of foldably interleaved sub-panels; and a contiguous display panel including a main area formed on an inner surface of each of the plurality of foldably interleaved sub-panels, an edge area formed on an edge surface of at least one of the plurality of foldably interleaved sub-panels, and a cover area formed on an outer surface of at least one of the plurality of foldably interleaved sub-panels, wherein the main area, the edge area, and the cover area are connected to each other and share at least one of a plurality of data lines or a plurality of gate lines.

BRIEF DESCRIPTION OF THE DRAWINGS

The above and other objects and features of the inventive concept will become apparent by describing in detail exemplary embodiments thereof with reference to the accompanying drawings, in which.

DETAILED DESCRIPTION

Exemplary embodiments of the inventive concept may be described in detail, and clearly to such an extent that those of ordinary skill in the pertinent art may easily implement the exemplary or other embodiments of the inventive concept without undue experimentation.

Figure 1A:
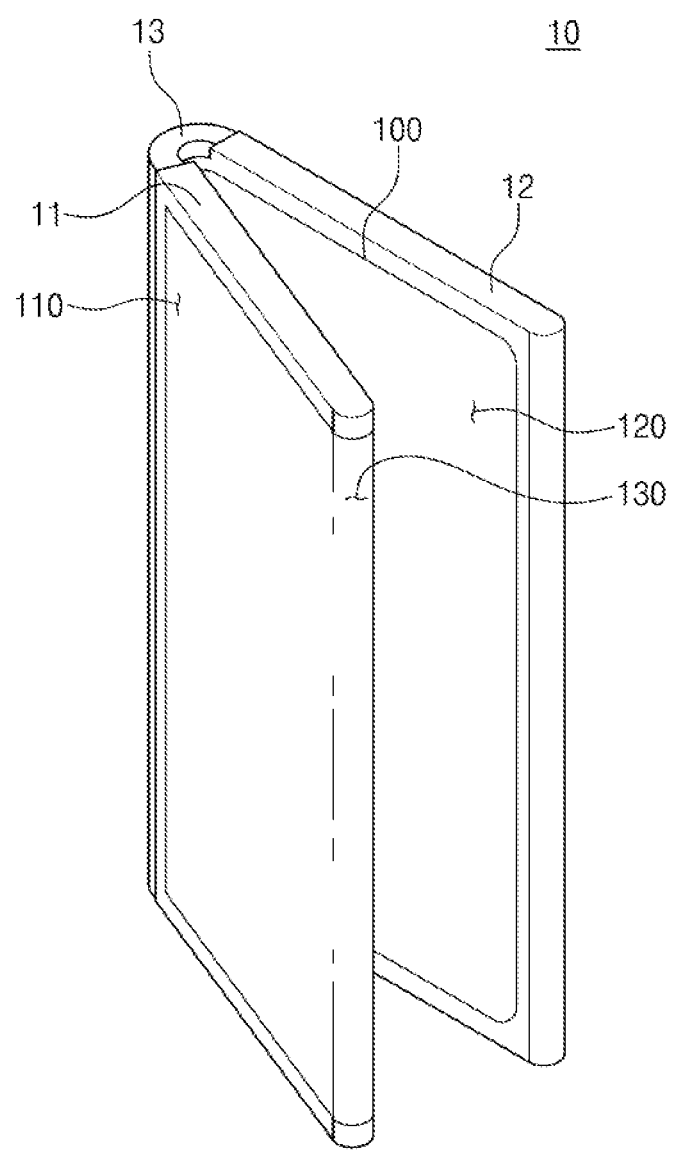
FIGS. 1A to 1C are projection diagrams illustrating an electronic device according to an embodiment of the inventive concept.
Figure 1B:
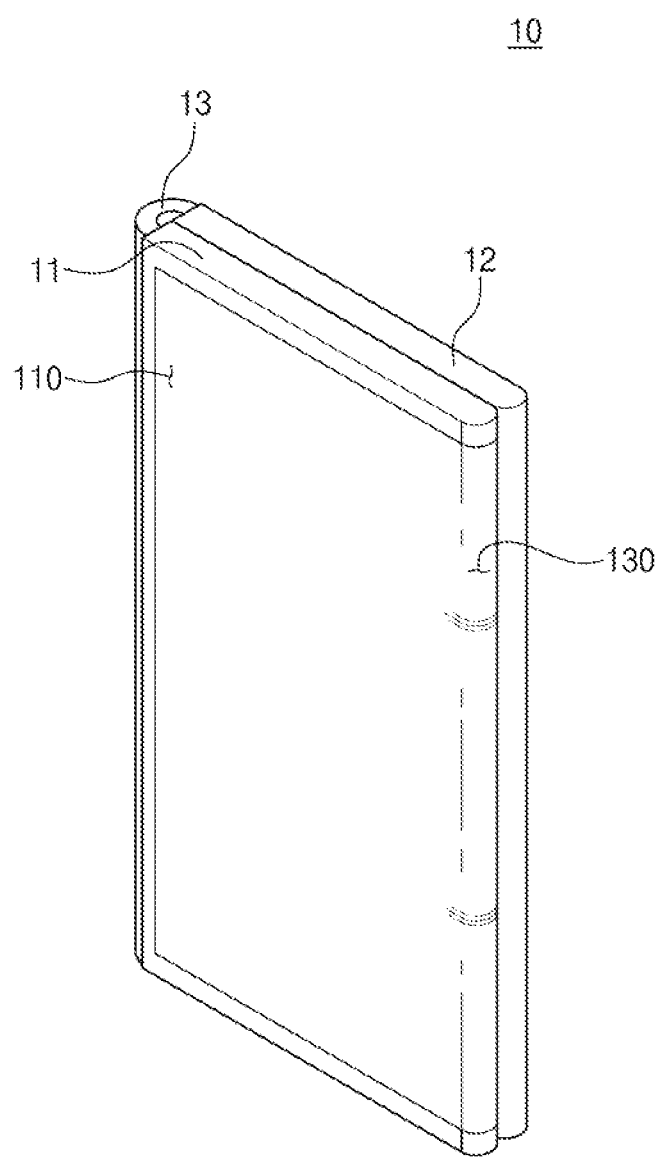
Figure 1C:
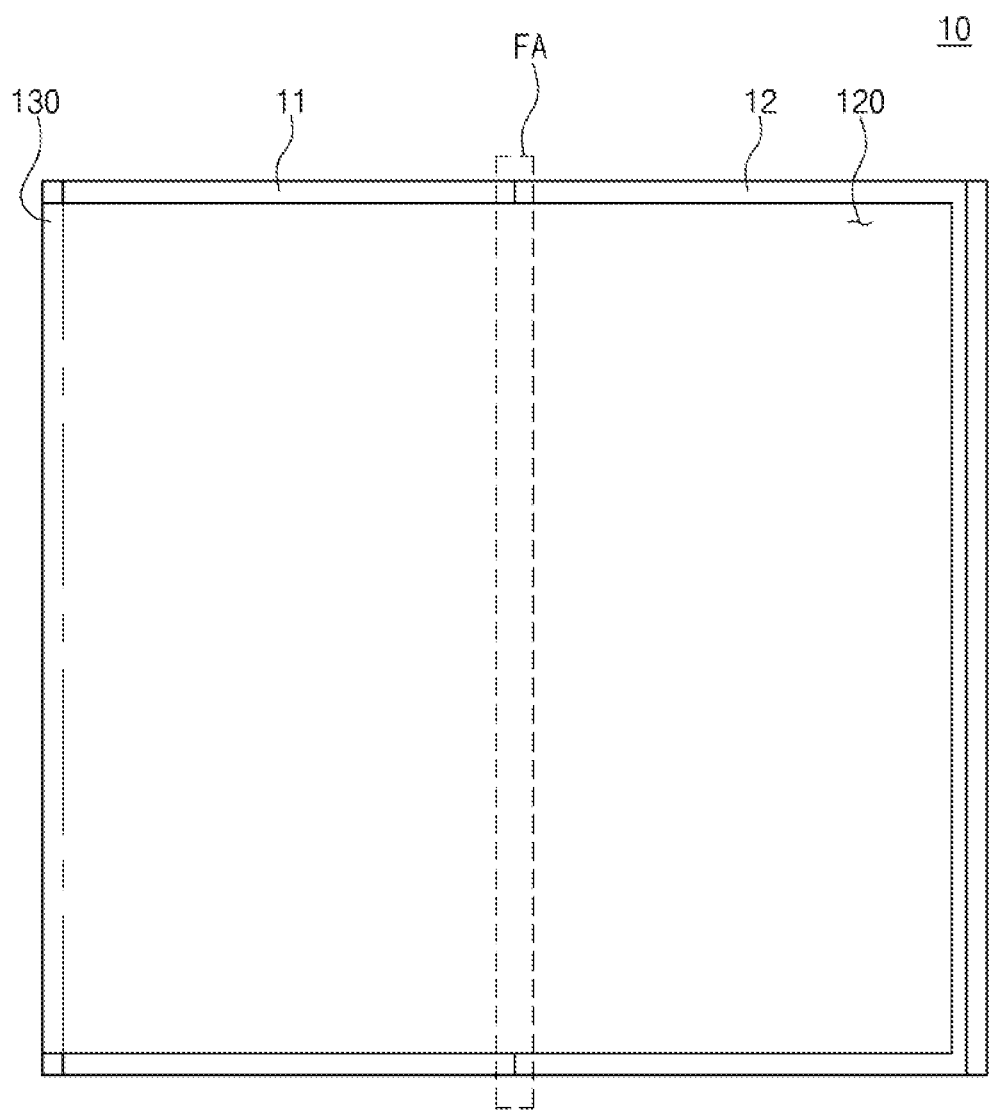

FIGS. 1A to 1C are views illustrating an electronic device according to an embodiment of the inventive concept. In an exemplary embodiment, FIG. 1A illustrates a perspective view for a schematic configuration of an electronic device 10, FIG. 1B illustrates a perspective view for a folded state of the electronic device 10, and FIG. 1C illustrates a plan view for an unfolded state of the electronic device 10. Referring to FIGS. 1A to 1C, the electronic device 10 may be a mobile device, such as a smartphone or a tablet, but is not limited thereto.

In an exemplary embodiment, the electronic device 10 may be a foldable device having a structure that is foldable through a hinge 13. For example, the electronic device 10 may include a first sub-device 11, a second sub-device 12, and the hinge 13. The first and second sub-devices 11 and 12 may include various components (e.g., a battery, an application processor, a memory, a storage device, and a modem) suitable for the electronic device 10 to operate. In an exemplary embodiment, each of the first and second sub-devices 11 and 12 may include a different printed circuit board, and the above components may be distributed into the first and second sub-devices 11 and 12, respectively. The first and second sub-devices 11 and 12 may be electrically connected to each other, and a function of the electronic device 10 may be implemented through the first and second sub-devices 11 and 12.

The first and second sub-devices 11 and 12 may be connected through the hinge 13. The hinge 13 may be connected between the first and second sub-devices 11 and 12 and may be configured to provide a folding function of the first and second sub-devices 11 and 12. That is, the first and second sub-devices 11 and 12 may be folded inwardly about the hinge 13 to face each other as illustrated in FIG. 1B, or may be unfolded to be parallel to a plane defined by a first direction DR1 and a second direction DR2 as illustrated in FIG. 1C. Below, for convenience of description, a state in which the first and second sub-devices 11 and 12 are folded about the hinge 13 to face each other may be called a "folded state" or a "closed state", and a state in which the first and second sub-devices 11 and 12 are unfolded to be parallel to a specific plane may be called an "unfolded state" or an "open state".

In an exemplary embodiment, in the case where the electronic device 10 is in the folded state, the surface area of the electronic device 10 may become smaller, and thus, the portability of the electronic device 10 may be improved. In contrast, in the case where the electronic device 10 is in the unfolded state, the display area of the electronic device 10 may increase, and thus, a large screen may be provided to the user. That is, the electronic device 10 may provide the portability of the electronic device 10 to the user in the folded state and may provide the large screen to the user in the unfolded state.

For example, the electronic device 10 may further include a display panel 100 bonded or formed on the first and second sub-devices 11 and 12. The display panel 100 may include a cover area 110, a main area 120, and a round-edge area 130. In alternate embodiments, the edge area 130 may be substantially flat. The cover area 110 may indicate an area on an outer surface of the first sub-device 11 of the display panel 100. In the case where the electronic device 10 is in the folded state, an image or specific information may be displayed through the cover area 110.

The main area 120 may indicate an area that is placed on both an inner surface of the first sub-device 11 and an inner surface of the second sub-device 12. In the case where the electronic device 10 is in the unfolded state, an image or specific information may be displayed through the main area 120. In the case where the electronic device 10 is in the folded state, the main area 120 may be folded about a folding sub-area FA to face itself. In an exemplary embodiment, the area of the folding sub-area FA may be based on a mechanical structure of the hinge 13 or a radius of curvature with which the main area 120 is folded.

In an exemplary embodiment, in the first and second sub-devices 11 and 12, an outer surface indicates a surface that is viewed on the outside or is exposed to the outside in the case where the electronic device 10 is in the folded state, and an inner surface indicates a surface that is not viewed on the outside or is not exposed to the outside in the case where the electronic device 10 is in the folded state. That is, an outer surface and an inner surface of the first sub-device 11 may indicate surfaces that are opposite to each other with respect to the first sub-device 11, and an outer surface and an inner surface of the second sub-device 12 may indicate surfaces that are opposite to each other with respect to the second sub-device 12.

Alternatively, in the case where the electronic device 10 is in the unfolded state, the inner surfaces of the first and second sub-devices 11 and 12 may be parallel to or substantially within the same plane, and the outer surfaces of the first and second sub-devices 11 and 12 may be parallel to or substantially within the same plane. That is, the electronic device 10 may be a foldable display device implemented in an in-folding type or structure, but the inventive concept is not limited thereto.

The round-edge area 130 may be placed between the cover area 110 and the main area 120. For example, the round-edge area 130 may indicate an area that is placed on a first side surface between the outer surface and the inner surface of the first sub-device 11. The cover area 110 and the main area 120 of the display panel 100 may be connected to each other through the round-edge area 130. In other words, the display panel 100 including the cover area 110, the main area 120, and the round-edge area 130 may be a single display panel formed through a single manufacturing process. That is, display pixels included in each of the cover area 110, the main area 120, and the round-edge area 130 of the display panel 100 may share the same data lines, the same gate lines, or other appropriate signal lines. Moreover, the cover area 110, the main area 120, and the round-edge area 130 of the display panel 100 may have or share the same type of pixel structure.

In an exemplary embodiment, the cover area 110 and the round-edge area 130 may have a rigid structure, and the main area 120 may have or include a flexible structure.

In an exemplary embodiment, the cover area 110 may indicate an area formed on an outer surface of the electronic device 10, and the main area 120 may indicate an area formed on an inner surface of the electronic device 10. The round-edge area 130 may be an area that is formed on a side surface of the electronic device 10 and connects the cover area 110 and the main area 120. The inner surface and the outer surface of the electronic device 10 may be defined as surfaces opposite to each other in the unfolded state of the electronic device 10, and the side surface of the electronic device 10 may indicate the remaining surface other than the inner surface and the outer surface in the unfolded state of the electronic device 10.

A conventional foldable electronic device, such as a foldable electronic device of an in-folding type, may need to use a separate display panel configured to display an image or information to the outside. However, as an area between the cover area or an outer display area 110 and the main area 120 may be implemented with the round-edge area 130, an electronic device 10 according to the inventive concept may provide a foldable display device of an in-folding type configured to display an image or information to the outside, in the folded and unfolded states, through the single display panel 100.

Figure 2:
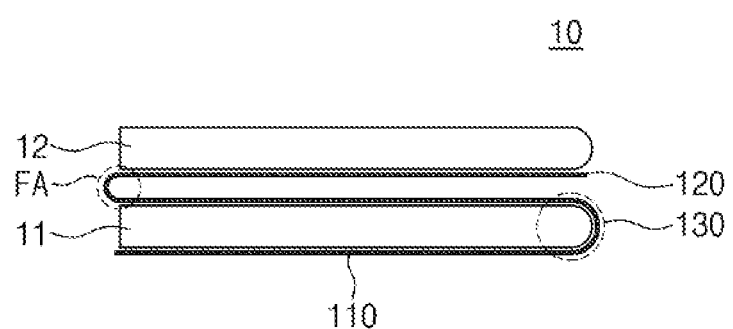
FIG. 2 is a projection diagram for describing a display panel included in an electronic device of FIGS. 1A to 1C.

FIG. 2 illustrates a top plan view for describing a display panel included in an electronic device of FIGS. 1A to 1C. For brevity of illustration and convenience of description, duplicate description may be omitted, and an example is illustrated in FIG. 2 as the electronic device 10 is in the folded state.

Referring to FIGS. 1A to 1C, the electronic device 10 may include the first and second sub-devices 11 and 12 and the display panel 100. As illustrated in FIG. 2, in the case where the electronic device 10 is in the folded state, the main area 120 of the display panel 100 may be folded about the folding sub-area FA between the first and second sub-devices 11 and 12, and the cover area 110 of the display panel 100 may be configured to display an image or information to the outside on the outer surface of the first sub-device 11. In other words, in the case where the electronic device 10 is in the folded state, the first sub-device 11 may be disposed between the cover area 110 and the main area 120, and the main area 120 folded about its folding sub-area FA may be disposed between the first and second sub-devices 11 and 12.

As illustrated in FIG. 2, the cover area 110 and the main area 120 may be connected to each other by the round-edge area 130 placed on the first side surface of the first sub-device 11. Alternatively, the round-edge area 130 placed on the first side surface of the first sub-device 11 may be placed between the cover area 110 and the main area 120. In an exemplary embodiment, the folding sub-area FA of the main area 120 may be folded depending on the folded state or the unfolded state of the electronic device 10, and the cover area 110 and the round-edge area 130 may have a fixed shape regardless of the folded state or the unfolded state of the electronic device 10.

In an exemplary embodiment, the cover area 110 may be formed to overlap at least a portion of the main area 120 (e.g., an area on the first sub-device 11), on a plane formed by the main area 120 in at least a partially unfolded state of the electronic device 10.

Alternately, the portion of the main area 120 on the inside of the sub-device 11 may be separable from the sub-device 11 to form an extra wide display, such as about three times wider than in the folded state, including, for example, the cover area 110, the edge portion 130 which may here be both separable and flexible, and the entire main area 120. In this alternate embodiment, it shall be understood that the portion of the main area 120 on the inside of the sub-device 11 is separable from the sub-device 11, but need not be flexible as long as the sub-area FA and the edge area 130 are at least partially flexible or hinged.

Figure 3A:
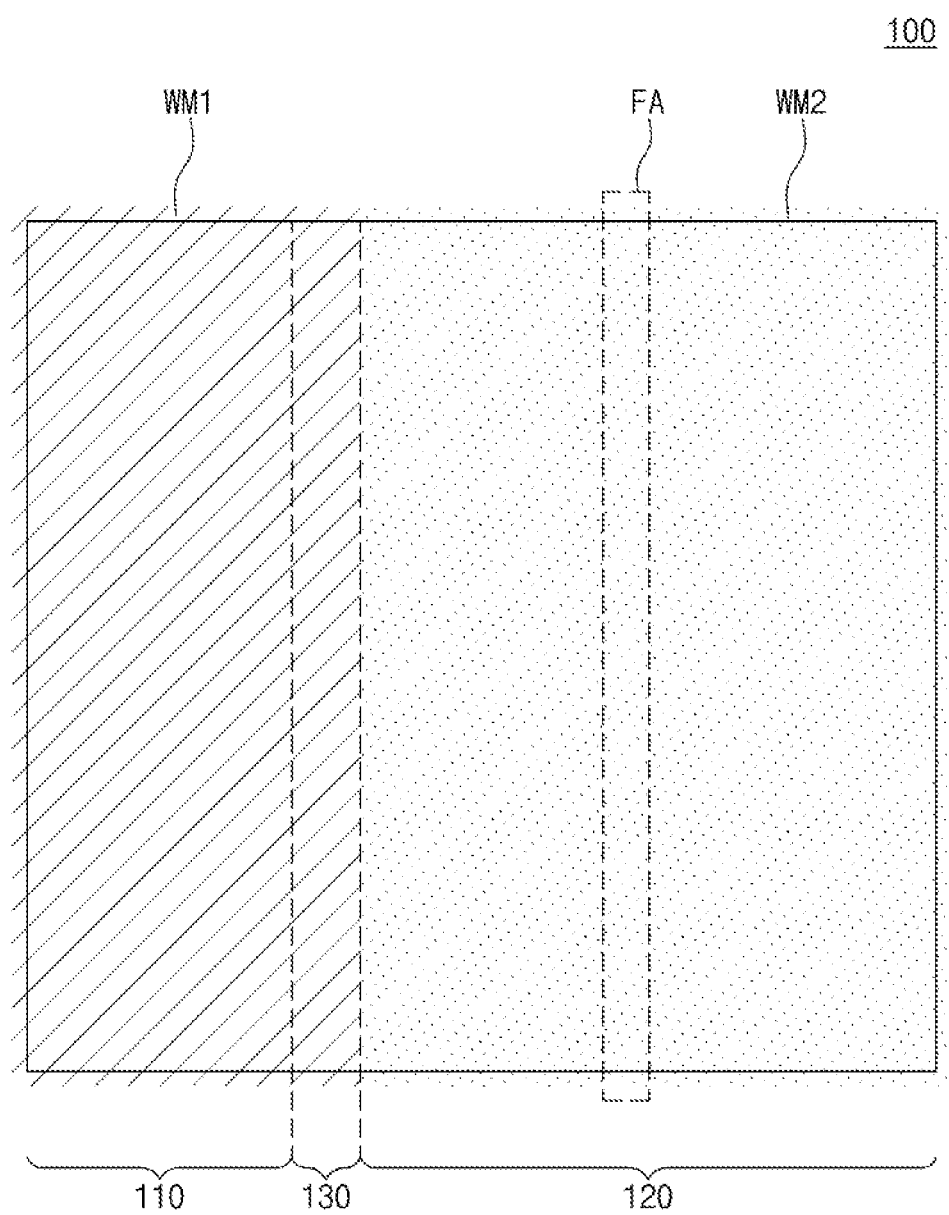
FIGS. 3A to 3C are partial schematic projection diagrams for describing a display panel of FIGS. 1A to 1C.
Figure 3B:
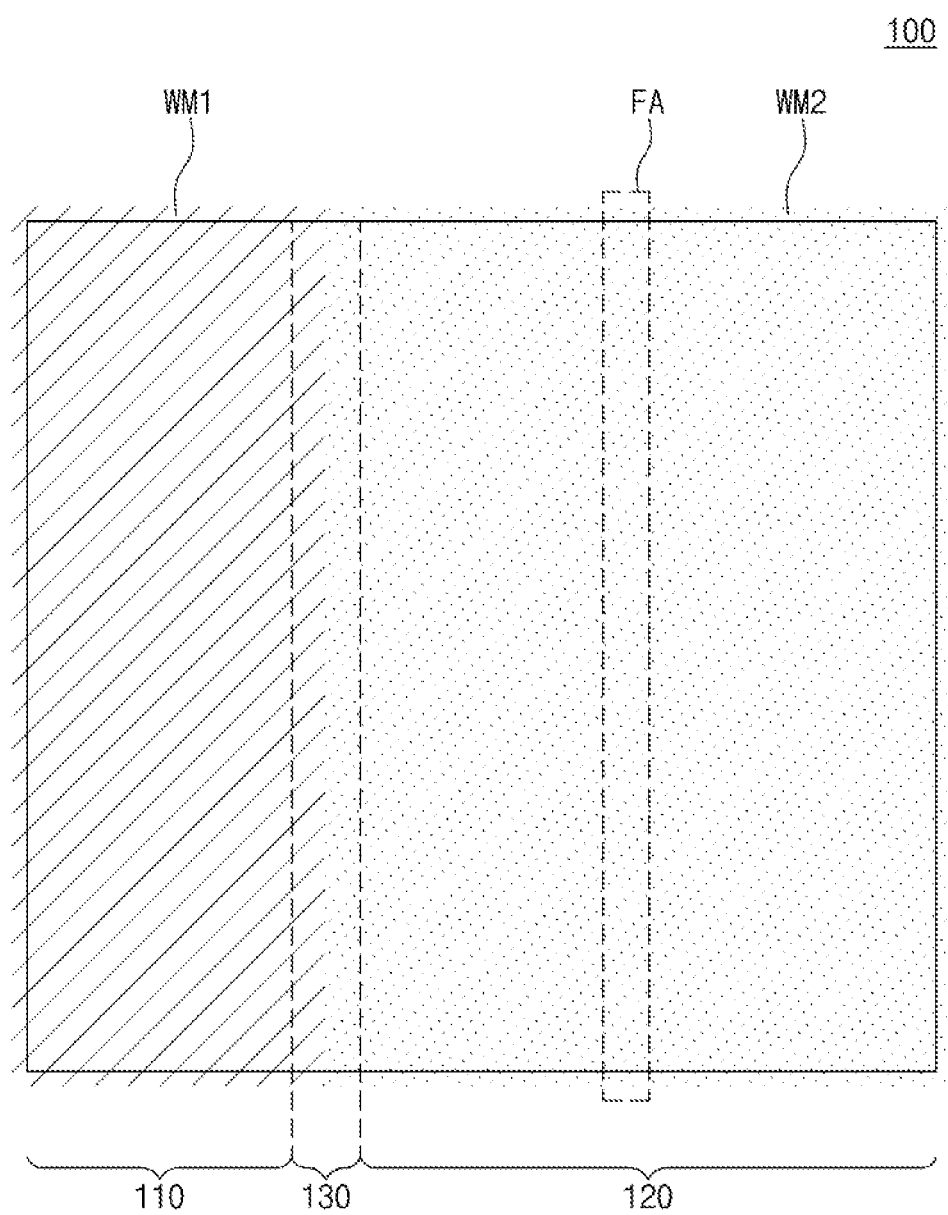
Figure 3C:
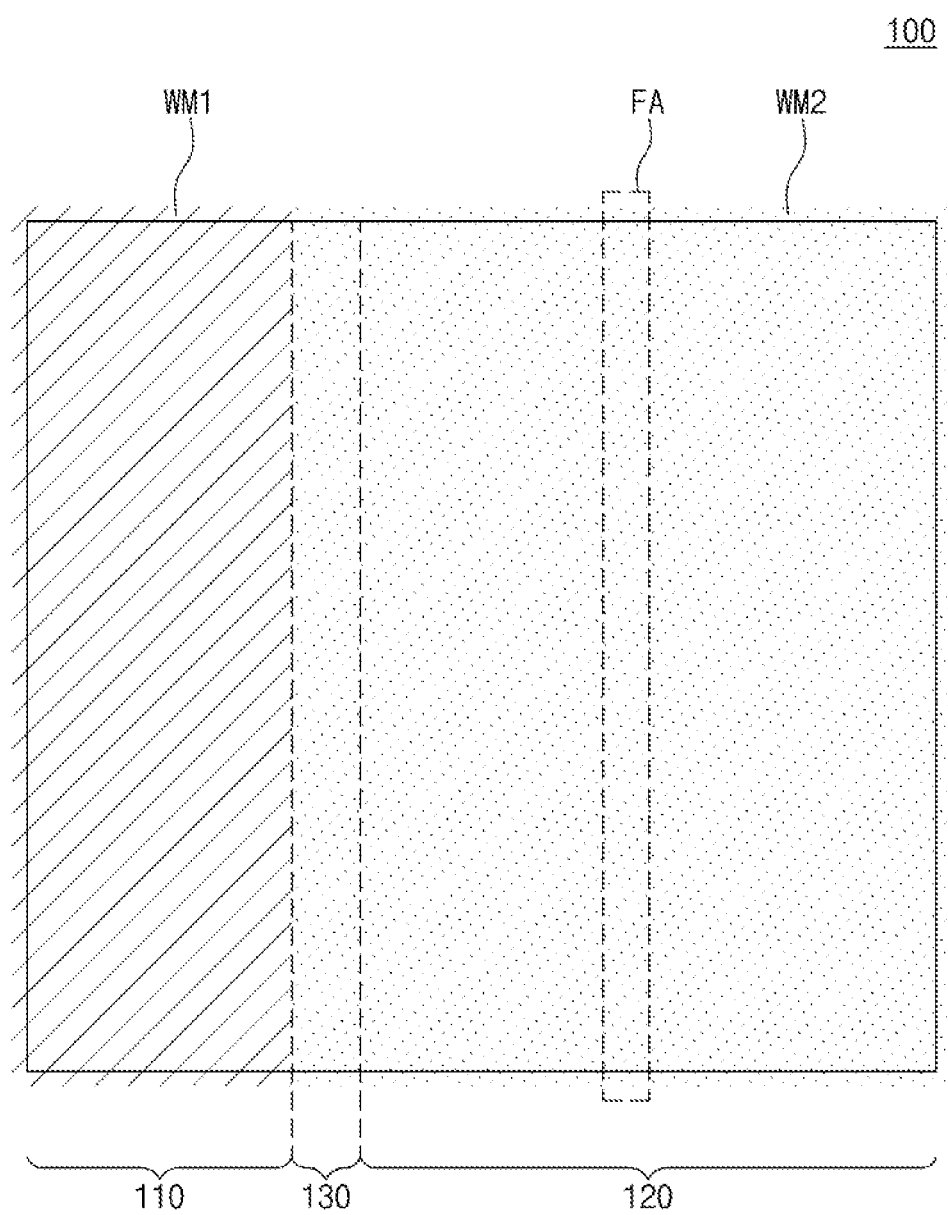

FIGS. 3A to 3C illustrate views for describing a display panel of FIGS. 1A to 1C. A structure in which the display panel 100 is unfolded on one plane will be exemplified below to describe an embodiment of the inventive concept easily, but the inventive concept is not limited thereto. As described above, the cover area 110 of the display panel 100 may be implemented at the electronic device 10 to face a partial area of the main area 120 with respect to the round-edge area 130.

Referring to FIGS. 1A to 3C, the display panel 100 may include the cover area 110, the round-edge area 130, and the main area 120. The main area 120 may include the folding sub-area FA configured to be foldable about the hinge 13.

As illustrated in FIGS. 3A to 3C, a first window WM1 and a second window WM2 may be formed or joined on the display panel 100. The first and second windows WM1 and WM2 are configured to protect the display panel 100 from external impact. Each of the first and second windows WM1 and WM2 may be implemented by using various materials. For example, the first window WM1 may be implemented in a fixed shape by using tempered glass or reinforced plastic. The second window WM2 may be implemented in a flexible shape by using a flexible material (e.g., colorless polyimide (CPI)).

In an exemplary embodiment, as illustrated in FIG. 3A, a boundary between the first window WM1 and the second window WM2 may be placed at a boundary between the round-edge area 130 and the main area 120. That is, the first window WM1 may be formed on the cover area 110 and the round-edge area 130, and the second window WM2 may be formed on the main area 120.

In an exemplary embodiment, as illustrated in FIG. 3B, a boundary between the first window WM1 and the second window WM2 may be included in the round-edge area 130. That is, the first window WM1 may be formed on the cover area 110 and a portion of the round-edge area 130, and the second window WM2 may be formed on the main area 120 and the remaining portion of the round-edge area 130.

In an exemplary embodiment, as illustrated in FIG. 3C, a boundary between the first window WM1 and the second window WM2 may be placed at a boundary between the cover area 110 and the round-edge area 130. That is, the first window WM1 may be formed on the cover area 110, and the second window WM2 may be formed on the round-edge area 130 and the main area 120.

In an exemplary embodiment, a physical characteristic of the first window WM1 may be different from a physical characteristic of the second window WM2. For example, the first window WM1 may be formed by using a material relatively strong against external impact compared with the second window WM2, for example, tempered glass, reinforced plastic, or the like. The second window WM2 may be implemented by using a flexible material (e.g., colorless polyimide (CP)) that may be relatively flexible compared with the first window WM1, but the inventive concept is not limited thereto.

That is, as the first window WM1 based on a material relatively strong against external impact is formed on the cover area 110 or the round-edge area 130, the cover area 110 or the round-edge area 130 exposed to the outside may be protected against external impact damage or scratches. As the second window WM2 based on a relatively flexible material is formed on the main area 120, a folding function of the main area 120 may be provided.

Alternatively, the first and second windows WM1 and WM2 formed on the display panel 100 may be implemented to have substantially the same physical characteristics.

FIGS. 4A to 4D illustrate perspective views for electronic devices according to embodiments of the inventive concept. For convenience of description, additional description associated with the above components may be omitted to avoid redundancy. Referring to FIGS. 4A to 4D, each of electronic devices 20a, 20b, 20c, and 20d may include a first sub-device 21, a second sub-device 22, a hinge 23, and a display panel 200. The display panel 200 may include a cover area 210, a main area 220, and a round-edge area 230. The first sub-device 21, the second sub-device 22, the hinge 23, the display panel 200, the cover area 210, the main area 220, and the round-edge area 230 are described above, and thus, additional description may be omitted to avoid redundancy.

Figure 4A:
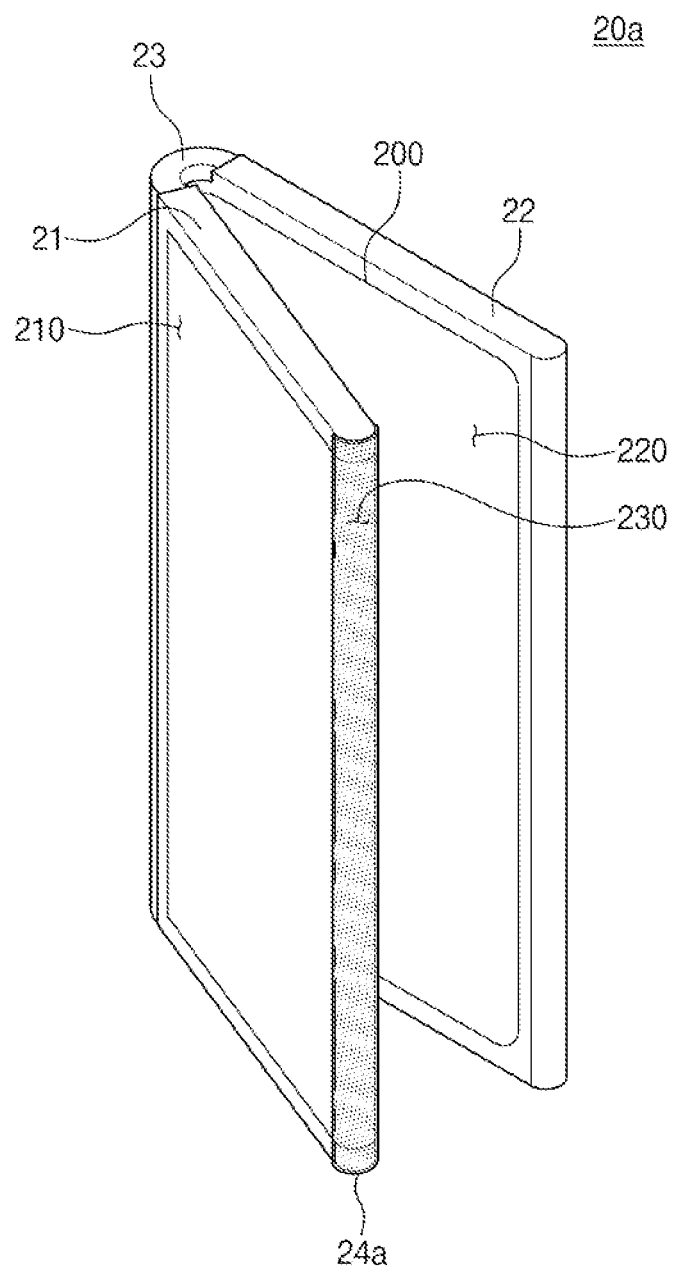
FIGS. 4A to 4D are perspective projection diagrams illustrating an electronic device according to an embodiment of the inventive concept.
Figure 4B:
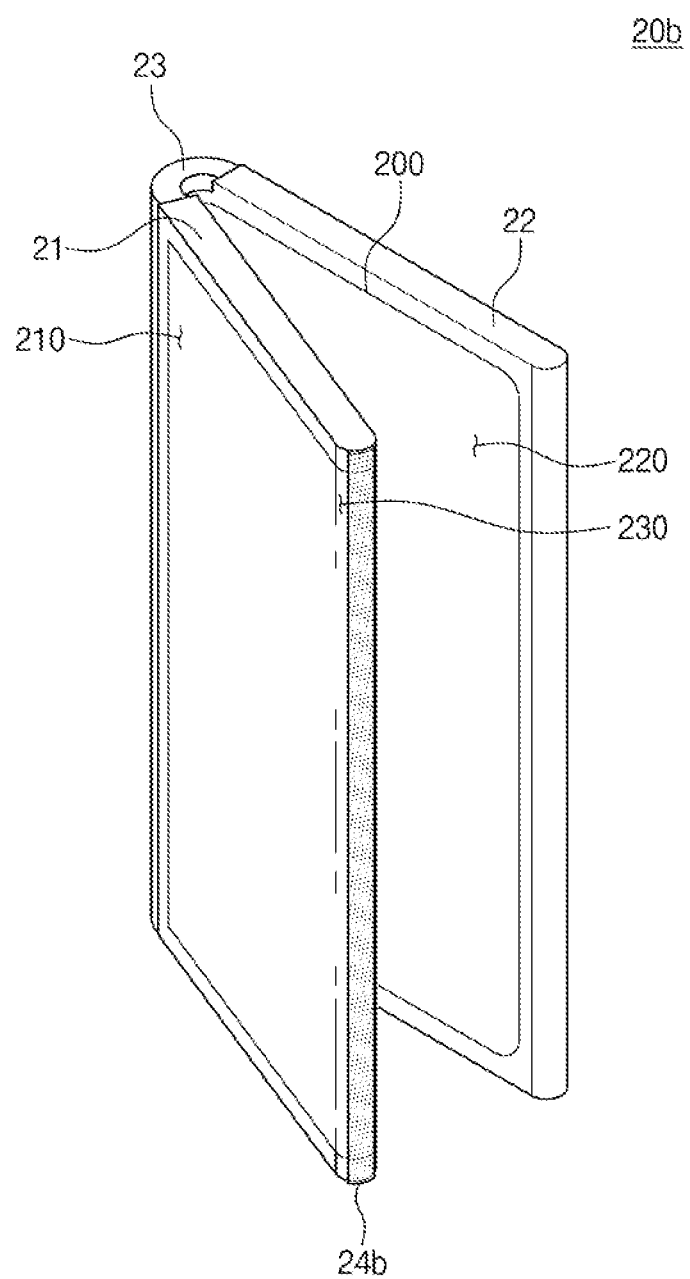
Figure 4C:
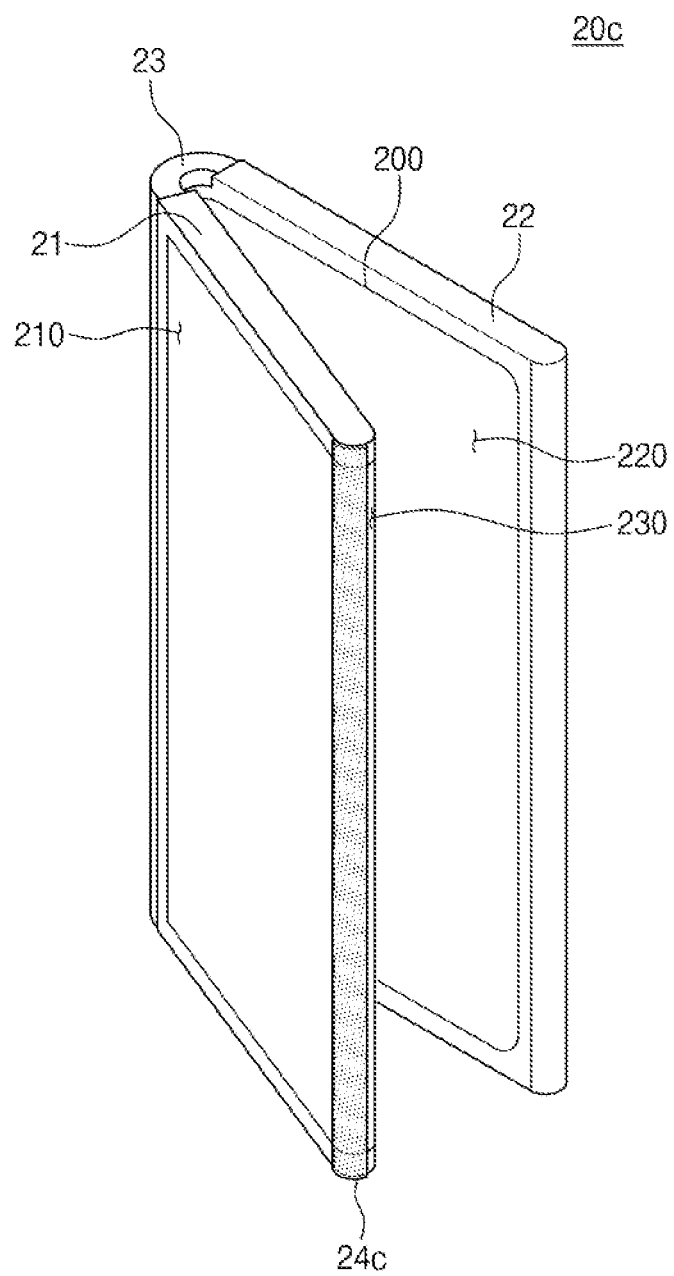
Figure 4D:
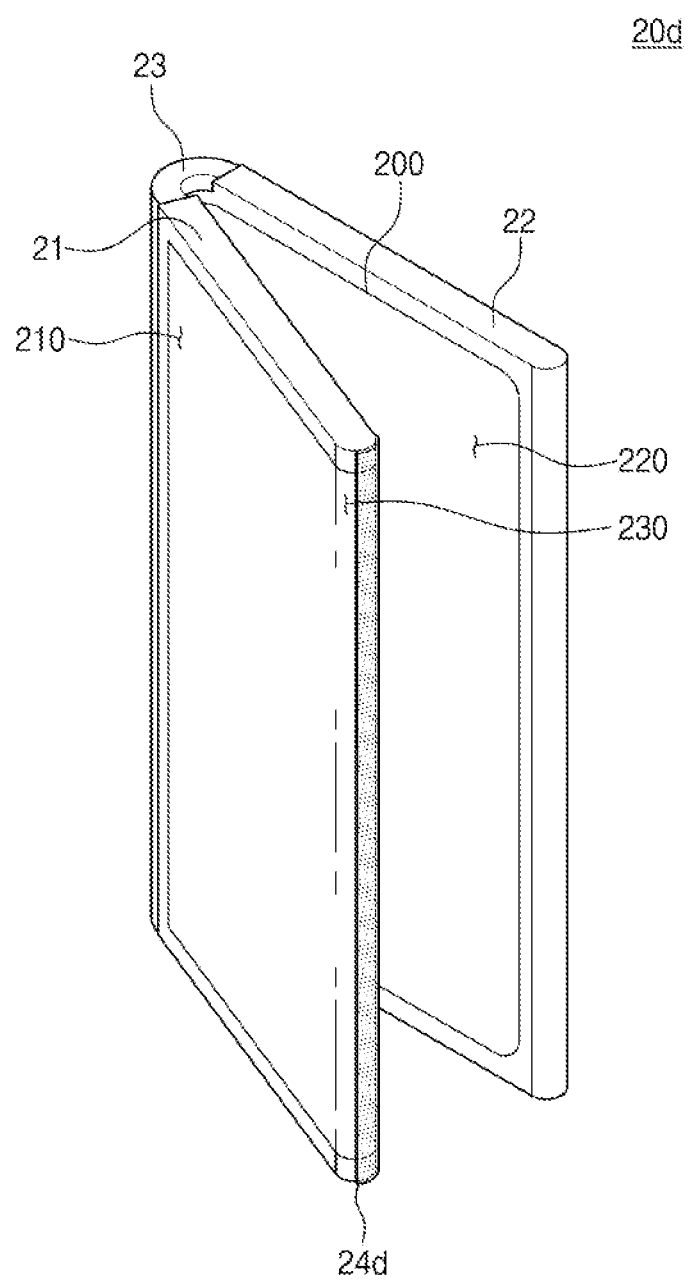

The electronic devices 20a, 20b, 20c, and 20d of FIGS. 4A to 4D may further include side frames 24a, 24b, 24c, and/or 24d, unlike the electronic device 10 of FIGS. 1A to 1C. Each of the side frames 24a, 24b, 24c, and 24d may be formed to cover at least a portion of the round-edge area 230. For example, as illustrated in FIG. 4A, the side frame 24a may be formed to surround the whole of the round-edge area 230. Alternatively, as illustrated in FIG. 4B, the side frame 24b may be formed to surround a central area of the round-edge area 230. Alternatively, as illustrated in FIG. 4C, the side frame 24c may be formed to surround a first outer portion of the round-edge area 230. Alternatively, as illustrated in FIG. 4D, the side frame 24d may be formed to surround a second outer portion of the round-edge area 230.

A central portion of the round-edge area 230 may indicate a portion of the round-edge area 230, which is spaced from the cover area 210 and the main area 220 as much as a given distance, respectively. The first outer portion of the round-edge area 230 may indicate an area of a portion of the round-edge area 230, which is adjacent to the cover area 210. The second outer portion of the round-edge area 230 may indicate an area of a portion of the round-edge area 230, which is adjacent to the main area 220.

That is, as described above, each of the side frames 24a to 24d may be formed on one side surface of the first sub-device 21, such as, for example, on one side surface of the first sub-device 21 on which the round-edge area 230 is formed, without limitation. As such, the round-edge area 230 may be protected against external impact. Alternatively, an unintended touch of the user on the round-edge area 230 may be prevented.

In an exemplary embodiment, information to be displayed on the round-edge area 230, or whether to activate or enable the round-edge area 230, may be controlled depending on a structure of the side frame 24a, 24b, 24c, or 24d or whether the side frame 24a, 24b, 24c, or 24d exists. For example, in the case where the side frame 24a, 24b, 24c, or 24d is implemented with an opaque material and is formed to surround the whole of the round-edge area 230, a display function or a touch function of the round-edge area 230 may be deactivated or disabled.

In an exemplary embodiment, the side frames 24a to 24d may be implemented with a transparent or opaque material. Alternatively, the side frames 24a to 24d may be formed of the same material as a housing included in the first sub-device 21. The side frames 24a to 24d may be formed as a portion of the housing of the first sub-device 11.

In an exemplary embodiment, the side frames 24a to 24d may be implemented to be attached to or detached from the first sub-device 21 or the housing of the first sub-device 21. That is, the user may selectively attach or detach the side frame 24a, 24b, 24c, or 24d to or from the first sub-device 21 depending on whether the user utilizes a function of the round-edge area 230.

In an exemplary embodiment, the side frame 24a, 24b, 24c, or 24d may be implemented with a portion of a protection case configured to be installable at the electronic device 20a, 20b, 20c, or 20d or the first and second sub-devices 21 and 22 for the purpose of protecting the exterior of the electronic device 20a, 20b, 20c, or 20d.

In an exemplary embodiment, in the case where the side frame 24a, 24b, 24c, or 24d is formed of an opaque material, the side frame 24a, 24b, 24c, or 24d may be formed on a boundary between the first and second windows WM1 and WM2 (refer to FIGS. 3A to 3C), and thus, the boundary between the first and second windows WM1 and WM2 may be prevented from outside exposure.

Figure 5:
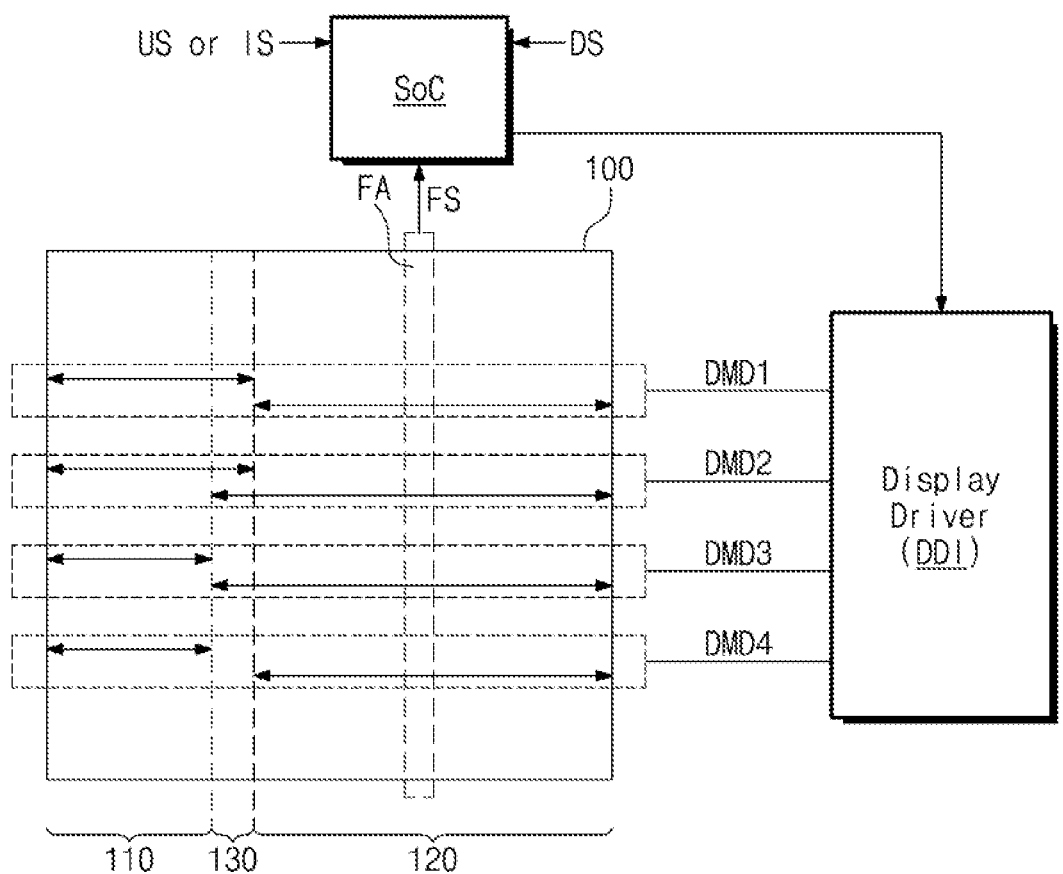
FIG. 5 is a hybrid schematic block diagram for describing a display panel driving method of an electronic device according to an embodiment of the inventive concept.

FIG. 5 is a diagram for describing a display panel driving method of an electronic device according to an embodiment of the inventive concept. For brevity of illustration and for convenience of description, with regard to the above-described components, additional description may be omitted to avoid redundancy. Referring to FIG. 5, an electronic device 10a may include the display panel 100, a system-on-chip SoC, and a display driver DDI. In an exemplary embodiment, each of the system-on-chip SoC and the display driver DDI may be included in the first sub-device 11 or the second sub-device 12.

As in the above description, the display panel 100 may include the cover area 110, the main area 120, and the round-edge area 130, and the main area 120 may be configured to be foldable about the folding sub-area FA. For brevity of illustration, the display panel 100 is illustrated on one plane, but the inventive concept is not limited thereto. The display panel 100 may be implemented as described with reference to FIGS. 1A to 1C, for example.

The system-on-chip SoC may control overall operations of the electronic device 10a. For example, the system-on-chip SoC may be an application processor (AP) configured to execute various programs to be driven on the electronic device 10a or to perform various operations.

The display driver DDI may be configured to control the display panel 100 under control of the system-on-chip SoC. For example, under control of the system-on-chip SoC, the display driver DDI may drive the display panel 100 based on one of various display modes DMD1 to DMD4. In detail, the system-on-chip SoC may select one of the display modes DMD1 to DMD4 based on initial settings IS, user settings US, device states DS, and a folding state FS of the electronic device 10a and may control the display driver DDI based on the selected display mode.

The initial settings IS may indicate a setting value of the electronic device 10a set in the process of manufacturing the electronic device 10a. For example, as described with reference to FIGS. 4A to 4D, the side frame 24a, 24b, 24c, or 24d may be formed on the round-edge area 130. In this case, the round-edge area 130 may be configured not to display separate information. That is, the initial settings IS may include information about an operating mode capable of being driven, or an operating mode incapable of being driven, depending on a shape of the electronic device 10a.

The user settings US may indicate information about a display mode set by the user. For example, the user of the electronic device 10a may select whether to display information on the round-edge area 130. That is, the user settings US may include information about whether to display information on the round-edge area 130, which is set by the user. In an exemplary embodiment, the user settings US may be input or set from or by the user through an operating system or an application that is driven by the system-on-chip SoC.

The device states DS may include information about a state of the electronic device 10a. For example, the device states DS may include various information about whether the electronic device 10a is in an idle state, in a state where a user input does not exist, or in a power saving mode. Alternatively, the device states DS may include information about a kind of an application being currently driven. For example, in the case where an application being currently driven plays a video, the display on the round-edge area 130 may be unnecessary for the user. In this case, the display on the round-edge area 130 may be deactivated.

The folding state FS may include information about whether the electronic device 10a is in the folded state or in the unfolded state, or a partially folded state. In an exemplary embodiment, the folding state FS may be sensed or detected from the hinge 13 or 23 described above, such as to measure a hinge folding angle.

The system-on-chip SoC may control the display driver DDI based on the above information (e.g., the initial settings IS, the user settings US, the device states DS, and the folding state FS). For example, in the case where the display on the round-edge area 130 is activated by the initial settings IS or the user settings US, the system-on-chip SoC may control the display driver DDI based on one of the first to third display modes DMD1 to DMD3. Alternatively, in the case where the display on the round-edge area 130 is deactivated by the initial settings IS or the user settings US, the system-on-chip SoC may control the display driver DDI based on the fourth display mode DMD4.

The first display mode DMD1 may indicate an operation mode in which information is displayed through the cover area 110 and the round-edge area 130 when the electronic device 10a is in the folded state and information is displayed through the main area 120 when the electronic device 10a is in an unfolded state. The second display mode DMD2 may indicate an operation mode in which information is displayed through the cover area 110 and the round-edge area 130 when the electronic device 10a is in the folded state and information is displayed through the main area 120 and the round-edge area 130 when the electronic device 10a is in an unfolded state. The third display mode DMD3 may indicate an operation mode in which information is displayed through the cover area 110 when the electronic device 10a is in the folded state and information is displayed through the main area 120 and the round-edge area 130 when the electronic device 10a is in an unfolded state. The fourth display mode DMD4 may indicate an operation mode in which information is displayed through the cover area 110 when the electronic device 10a is in the folded state and information is displayed through the main area 120 when the electronic device 10a is in an unfolded state.

In an exemplary embodiment, in the case where the device states DS indicate an idle state, a power saving mode or the like of the electronic device 10a, the system-on-chip SoC may control the display driver DDI such that information is not displayed through the display panel 100.

That is, as described above, the system-on-chip SoC may select one of the display modes DMD1 to DMD4 based on the initial settings IS, the user settings US, the device states DS, or the folding state FS and may control the display driver DDI based on the selected display mode.

The above-described display modes are examples of the inventive concept, but the inventive concept is not limited thereto.

In an exemplary embodiment, the display driver DDI may include a plurality of display driver integrated circuits configured to drive the display panel 100. In an exemplary embodiment, the display driver DDI may control the cover area 110, the main area 120, and the round-edge area 130 of the display panel 100 selectively and individually by selectively controlling a gate driver included in the display panel 100.

Figure 6:
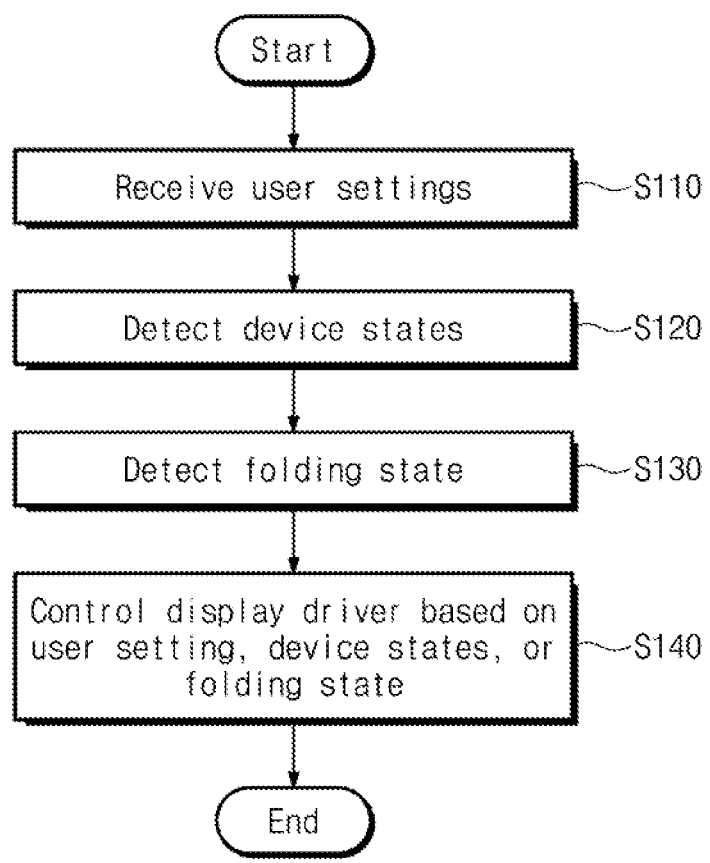
FIG. 6 is a flowchart diagram illustrating an operation of a system-on-chip of FIG. 5.

FIG. 6 illustrates an operation of a system-on-chip of FIG. 5. Referring to FIGS. 5 and 6, in operation S110, the system-on-chip SoC may receive the user settings US. In an exemplary embodiment, the user settings US may be input from the user through a user interface (e.g., a touch interface or any other appropriate input means).

In operation S120, the system-on-chip SoC may detect the device states DS. For example, the system-on-chip SoC may detect whether the electronic device 10a is in an idle state, in a state where a user input does not exist, in a power saving mode, running a kind of application, or the like.

In operation S130, the system-on-chip SoC may detect the folding state FS. For example, the system-on-chip SoC may detect the folding state FS of the electronic device 10a, including whether the electronic device 10a is in the folded state or in the unfolded state, based on a working state of the hinge 13.

In operation S140, the system-on-chip SoC may control the display driver DDI based on the user settings US, the device states DS, the folding state FS, or the initial settings IS. For example, the system-on-chip SoC may select one of various display modes based on the user settings US, the device states DS, the folding state FS, and/or the initial settings IS and may control the display driver DDI based on the selected display mode. Exemplary display modes are described above, and thus, additional description may be omitted to avoid redundancy.

Figure 7:
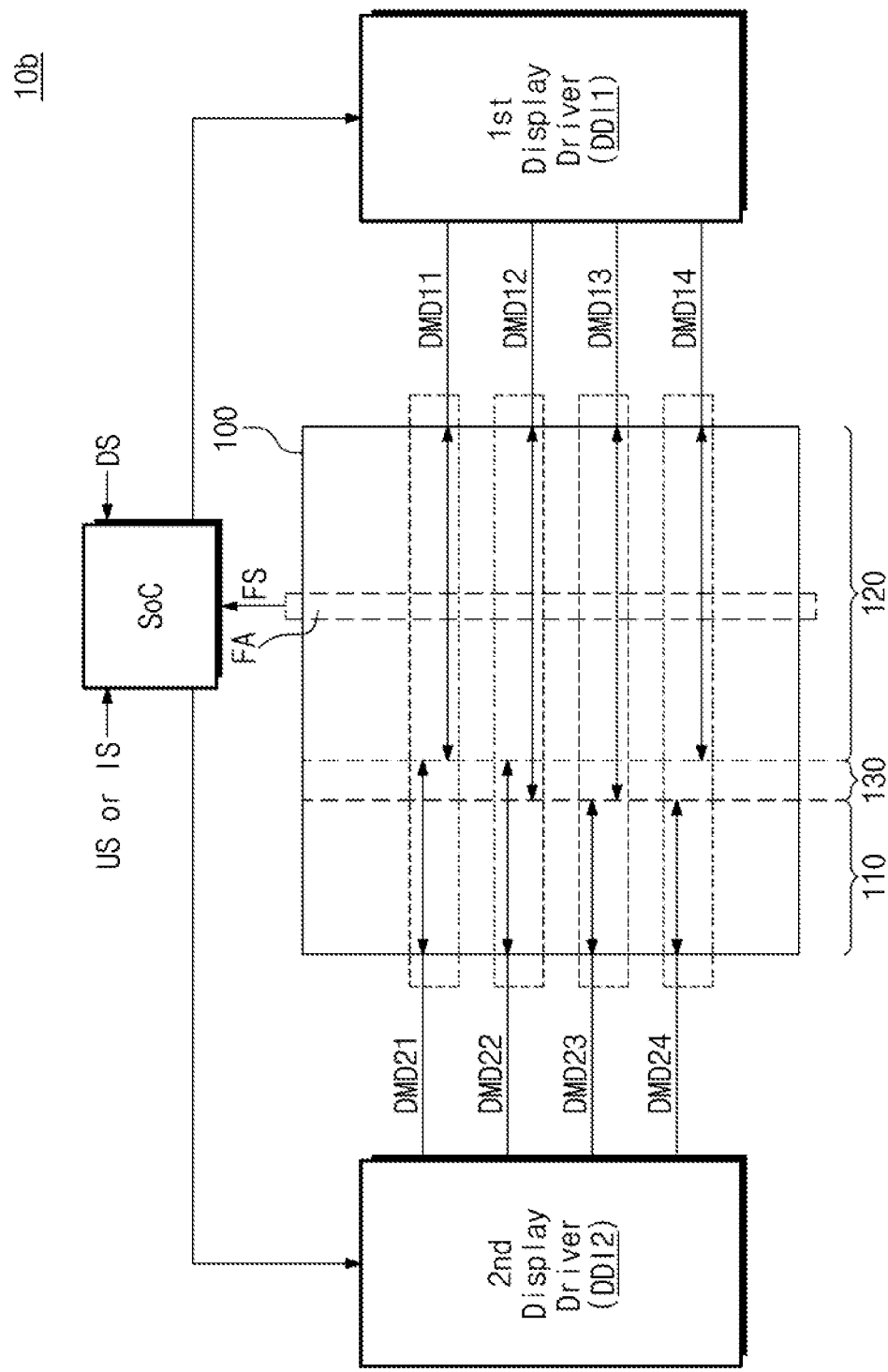
FIG. 7 is a hybrid schematic block diagram for describing a display panel driving method of an electronic device according to an embodiment of the inventive concept.

FIG. 7 illustrates an electronic device according to an embodiment of the inventive concept. For brevity of illustration and for convenience of description, with regard to the above-described components, additional description may be omitted to avoid redundancy. Referring to FIG. 7, an electronic device 10b may include the system-on-chip SoC, the display panel 100, and first and second display drivers DDI1 and DDI2. The display panel 100 may include the cover area 110, the main area 120, and the round-edge area 130. The main area 120 may include the folding sub-area FA.

Unlike the embodiment described immediately above, the electronic device 10b of FIG. 7 may include two display drivers DDI1 and DDI2. The two display drivers DDI1 and DDI2 may operate independently of each other and may be configured to individually control at least different partial areas of the display panel 100.

For example, the first display driver DDI1 may be configured to control the main area 120 of the display panel 100 under control of the system-on-chip SoC. Alternatively, the first display driver DDI1 may be configured to control the main area 120 and the round-edge area 130 of the display panel 100 under control of the system-on-chip SoC. The second display driver DDI2 may be configured to control the cover area 110 of the display panel 100 under control of the system-on-chip SoC. Alternatively, the second display driver DDI2 may be configured to control the cover area 110 and the round-edge area 130 of the display panel 100 under control of the system-on-chip SoC.

The system-on-chip SoC may individually control the first and second display drivers DDI1 and DDI2, based on the initial settings IS, the user settings US, the device states DS, or the folding state FS. The initial settings IS, the user settings US, the device states DS, or the folding state FS are described above, and thus, additional description may be omitted to avoid redundancy.

For example, in the case where the user settings US or the initial settings IS are set to support the display of the round-edge area 130 and the folding state FS indicates the unfolded state of the electronic device 10b, the system-on-chip SoC may control the first display driver DDI1, based on at least one of display modes DMD11, DMD12, or DMD13, and may deactivate the second display driver DDI2.

In the case where the user settings US or the initial settings IS are set to support the display of the round-edge area 130 and the folding state FS indicates the folded state of the electronic device 10b, the system-on-chip SoC may control the second display driver DDI2, based on at least one of display modes DMD21, DMD22, or DMD23, and may deactivate the first display driver DDI1.

In the case where the user settings US or the initial settings IS are set not to support the display of the round-edge area 130 and the folding state FS indicates the unfolded state of the electronic device 10b, the system-on-chip SoC may control the first display driver DDI1, based on the display mode DMD14, and may deactivate the second display driver DDI2.

In the case where the user settings US or the initial settings IS are set not to support the display of the round-edge area 130 and the folding state FS indicates the folded state of the electronic device 10b, the system-on-chip SoC may control the second display driver DDI2, based on the display mode DMD24, and may deactivate the first display driver DDI1.

The display modes "DMD11" and "DMD14" may indicate modes in which the main area 120 but not the round-edge area 130 of the display panel 100 is controlled by the first display driver DDI1, and the display modes "DMD12" and "DMD13" may indicate modes in which the main area 120 and the round-edge area 130 of the display panel 100 are controlled by the first display driver DDI1. The display modes "DMD21" and "DMD22" may indicate modes in which the cover area 110 and the round-edge area 130 of the display panel 100 are controlled by the second display driver DDI2, and the display modes "DMD23" and "DMD24" may indicate modes in which the cover area 110 but not the round-edge area 130 of the display panel 100 is controlled by the second display driver DDI2.

That is, as described above, the electronic device 10b may include two or more display drivers (e.g., DDI1 and DDI2) configured to be driven independently of each other. The system-on-chip SoC of the electronic device 10b may individually control at least two display drivers based on various information (e.g., US, IS, DS, FS, or the like).

Figure 8:
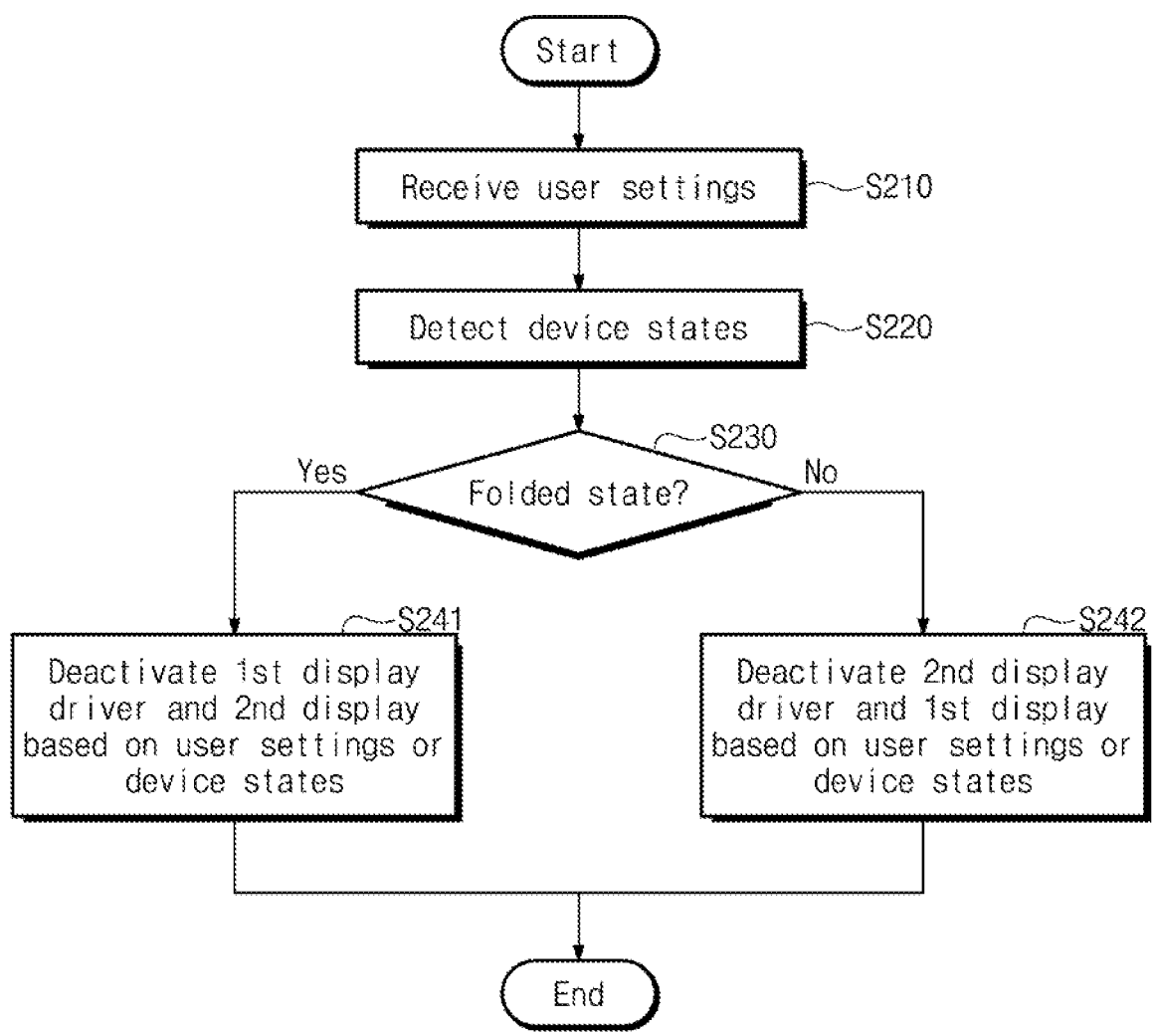
FIG. 8 is a flowchart diagram illustrating an operation of a system-on-chip of FIG. 7.

FIG. 8 illustrates an operation of a system-on-chip of FIG. 7. Referring to FIGS. 7 and 8, the system-on-chip SoC may perform operation S210 and operation S220. Operation S210 and operation S220 are similar to operation S110 and operation S120 of FIG. 6, and thus, additional description may be omitted to avoid redundancy.

In operation S230, the system-on-chip SoC may determine whether the electronic device 10b is in the fully folded state. When the electronic device 10b is in the fully folded state, in operation S241, the system-on-chip SoC may deactivate the first display driver DDI1 and may control the second display driver DDI2 based on the user settings US, the device states DS, or the initial settings IS. When the electronic device 10b is in an unfolded state, in operation S242, the system-on-chip SoC may deactivate the second display driver DDI2 and may control the first display driver DDI1 based on the user settings US, the device states DS, or the initial settings IS. Operation S241 and operation S242 are described with reference to FIG. 7, and thus, additional description may be omitted to avoid redundancy.

As described above, in a foldable electronic device implemented with one display panel 100, the system-on-chip SoC may select a display mode based on various information; the system-on-chip SoC may control the display panel 100 based on the selected display mode such that the display panel 100 is divided into different areas, or may independently control different display drivers based on the selected display mode. Accordingly, the complexity of design of the system-on-chip SoC in the foldable electronic device may decrease.

Figure 9:
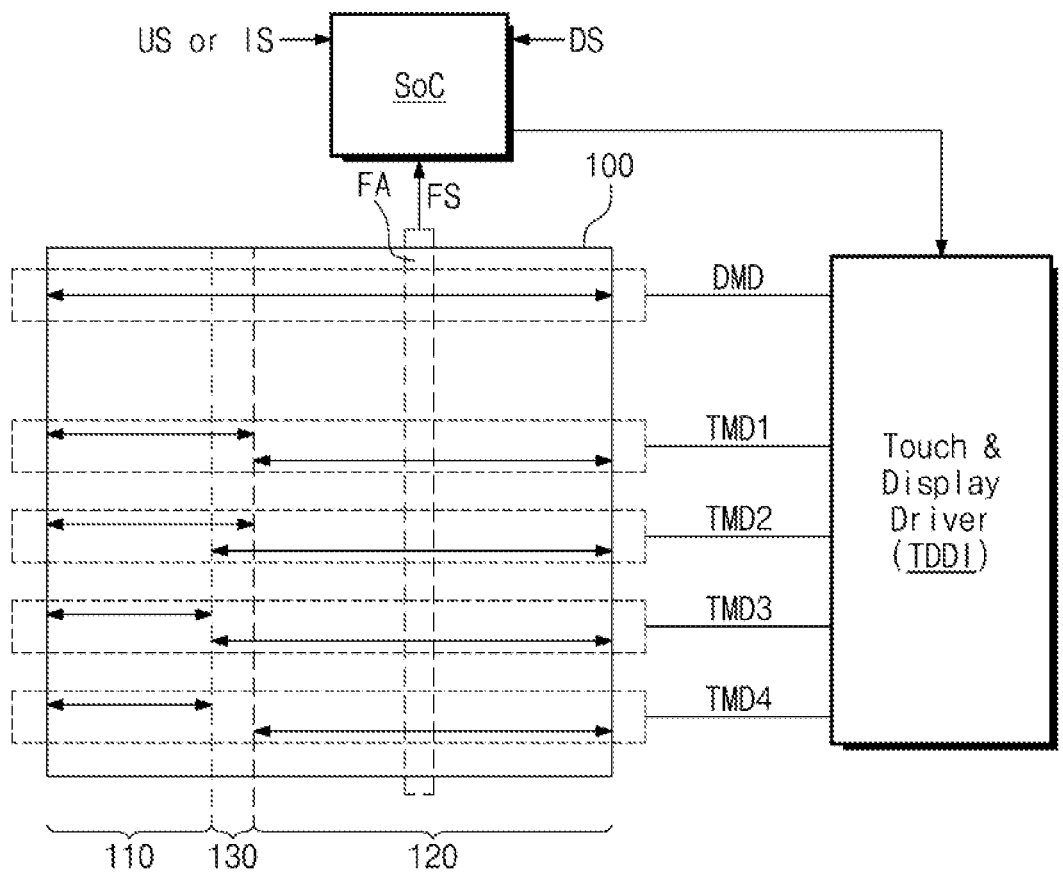
FIG. 9 is a hybrid schematic block diagram illustrating an operating method of an electronic device according to an embodiment of the inventive concept.

FIG. 9 illustrates an electronic device according to an embodiment of the inventive concept. For brevity of illustration and convenience of description, with regard to the above-described components, additional description may be omitted to avoid redundancy.

Referring to FIG. 9, an electronic device 10c may include the system-on-chip SoC, the display panel 100, and a touch and display driver TDDI. The display panel 100 may include the cover area 110, the main area 120, and the round-edge area 130, and the main area 120 may include the folding sub-area FA. In an exemplary embodiment, the display panel 100 may include a touch sensing layer configured to sense a touch of the user. That is, a touch of the user, or a user touch input, may be sensed through the touch sensing layer of the display panel 100.

The touch and display driver TDDI may be configured to control the display panel 100 under control of the system-on-chip SoC. For example, the system-on-chip SoC may select one of various display modes DMD based on the initial settings IS, the user settings US, the device states DS, and/or the folding state FS, and may control the touch and display driver TDDI based on the selected display mode. The touch and display driver TDDI may be configured to display information through the display panel 100 under control of the system-on-chip SoC. In an exemplary embodiment, for brevity of illustration, the display mode DMD of the touch and display driver TDDI is briefly illustrated in FIG. 9; however, the display mode DMD of the touch and display driver TDDI may indicate the display modes DMD1 to DMD4 described with reference to FIG. 6 and an operation of the touch and display driver TDDI may be similar to the operation of the display driver DDI described with reference to FIG. 6.

The system-on-chip SoC may select one of various touch modes TMD1 to TMD4 based on the initial settings IS, the user settings US, the device states DS, or the folding state FS and may control the touch and display driver TDDI based on the selected touch mode. The touch and display driver TDDI may control the display panel 100 under control of the system-on-chip SoC and may sense a touch from the user.

For example, in the case where the first touch mode TMD1 is selected based on the user settings US or the initial settings IS, the touch and display driver TDDI may perform a touch sensing operation on the main area 120 of the display panel 100 in the unfolded state of the electronic device 10c, and may perform a touch sensing operation on the cover area 110 and the round-edge area 130 of the display panel 100 in the folded state of the electronic device 10c.

In the case where the second touch mode TMD2 is selected based on the user settings US or the initial settings IS, the touch and display driver TDDI may perform a touch sensing operation on the main area 120 and the round-edge area 130 of the display panel 100 in the unfolded state of the electronic device 10c and may perform a touch sensing operation on the cover area 110 and the round-edge area 130 of the display panel 100 in the folded state of the electronic device 10c.

In the case where the third touch mode TMD3 is selected based on the user settings US or the initial settings IS, the touch and display driver TDDI may perform a touch sensing operation on the main area 120 and the round-edge area 130 of the display panel 100 in the unfolded state of the electronic device 10c and may perform a touch sensing operation on the cover area 110 of the display panel 100 in the folded state of the electronic device 10c.

In the case where the fourth touch mode TMD4 is selected based on the user settings US or the initial settings IS, the touch and display driver TDDI may perform a touch sensing operation on the main area 120 of the display panel 100 in the unfolded state of the electronic device 10c and may perform a touch sensing operation on the cover area 110 of the display panel 100 in the folded state of the electronic device 10c.

That is, as in the configuration for selecting the display mode described above, the system-on-chip SoC may select a touch mode based on various information (e.g., US, IS, DS, and FS) and may independently control respective areas of the display panel 100 based on the selected touch mode. The touch mode need not correspond to the display mode, although embodiments are not limited thereto.

Figure 10:
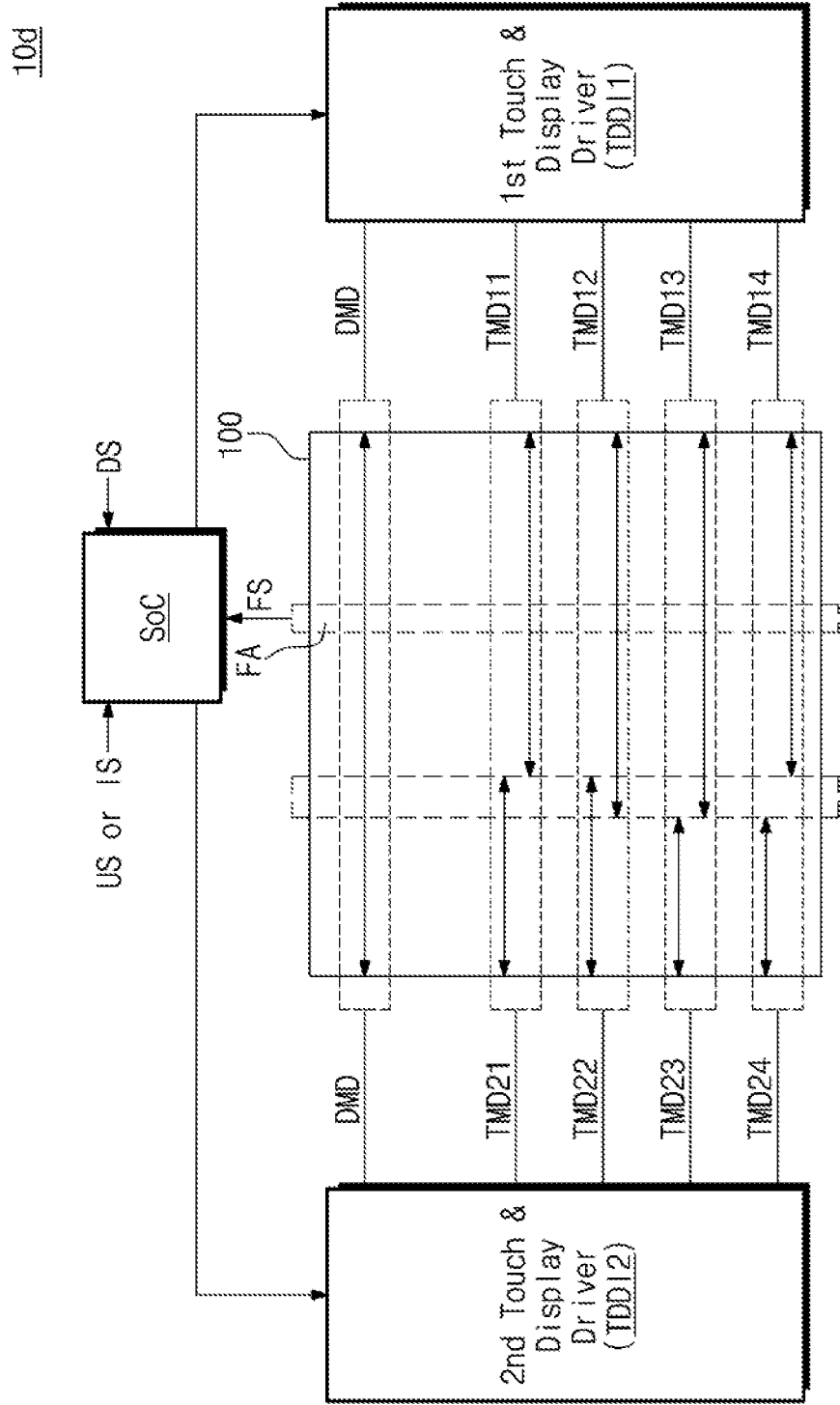
FIG. 10 is a hybrid schematic block diagram illustrating an operating method of an electronic device according to an embodiment of the inventive concept.

FIG. 10 illustrates an electronic device according to an embodiment of the inventive concept. For brevity of illustration and for convenience of description, with regard to the above-described components, additional description may be omitted to avoid redundancy.

Referring to FIG. 10, an electronic device 10d may include the system-on-chip SoC, the display panel 100, a first touch and display driver TDDI1, and a second touch and display driver TDDI2. The display panel 100 may include the cover area 110, the main area 120, and the round-edge area 130, and the main area 120 may include the folding sub-area FA. In an exemplary embodiment, the display panel 100 may include a touch sensing layer configured to sense a touch of the user. That is, a touch of the user, or a user touch input may be sensed through the touch sensing layer of the display panel 100.

As in the above description given with reference to FIGS. 7 and 8, the system-on-chip SoC may select one of various display modes DMD based on various information (e.g., US, IS, DS, and FS) and may control the first touch and display driver TDDI1 and the second touch and display driver TDDI2 based on the selected display mode, respectively. This is described with reference to FIGS. 7 and 8, and thus, additional description may be omitted to avoid redundancy.

The system-on-chip SoC may select one of various touch modes based on various information (e.g., US, IS, DS, and FS) and may control the first touch and display driver TDDI1 and the second touch and display driver TDDI2 based on the selected touch mode, respectively.

For example, in the case where a touch on the round-edge area 130 is supported by the user settings US or the initial settings IS, depending on the folding state FS, the system-on-chip SoC may deactivate the second touch and display driver TDDI2 and may control the first touch and display driver TDDI1 based on the touch modes TMD11, TMD12, and TMD13. Similarly, in the case where a touch on the round-edge area 130 is supported by the user settings US or the initial settings IS, depending on the folding state FS, the system-on-chip SoC may deactivate the first touch and display driver TDDI1 and may control the second touch and display driver TDDI2 based on the touch modes TMD21, TMD22, and TMD23.

In the case where a touch on the round-edge area 130 is not supported by the user settings US or the initial settings IS, depending on the folding state FS, the system-on-chip SoC may deactivate the second touch and display driver TDDI2 and may control the first touch and display driver TDDI1 based on the touch mode TMD14. Similarly, in the case where a touch on the round-edge area 130 is not supported by the user settings US or the initial settings IS, depending on the folding state FS, the system-on-chip SoC may deactivate the first touch and display driver TDDI1 and may control the second touch and display driver TDDI2 based on a touch mode TMD24.

For the first touch and display driver TDDI1, the touch modes "TMD11" and "TMD14" may indicate a touch mode in which a touch scan is performed on the main area 120 but not on the round-edge area 130 of the display panel 100, and the touch modes "TMD12" and "TMD13" may indicate a touch mode in which a touch scan is performed on the main area 120 and the round-edge area 130 of the display panel 100. For the second touch and display driver TDDI2, the touch modes "TMD21" and "TMD22" may indicate a touch mode in which a touch scan is performed on the cover area 110 and the round-edge area 130 of the display panel 100, and the touch modes "TMD23" and "TMD24" may indicate a touch mode in which a touch scan is performed on the cover area 110 but not on the round-edge area 130 of the display panel 100. That is, as described above, a display operation and a touch scan operation of the round-edge area 130 may be disabled by the user settings US or the initial settings IS.

According to the above embodiments of the inventive concept, in an electronic device implemented in an in-folding type, a main area configured to provide a large screen in the unfolded state and a cover area configured to display information in the folded state may be implemented through a single display panel. A system-on-chip included in the electronic device may be configured to control respective specific areas, such as a cover area, a main area, and a round-edge area, of the single display panel independently based on various information of the electronic device or user settings.

Figure 11A:
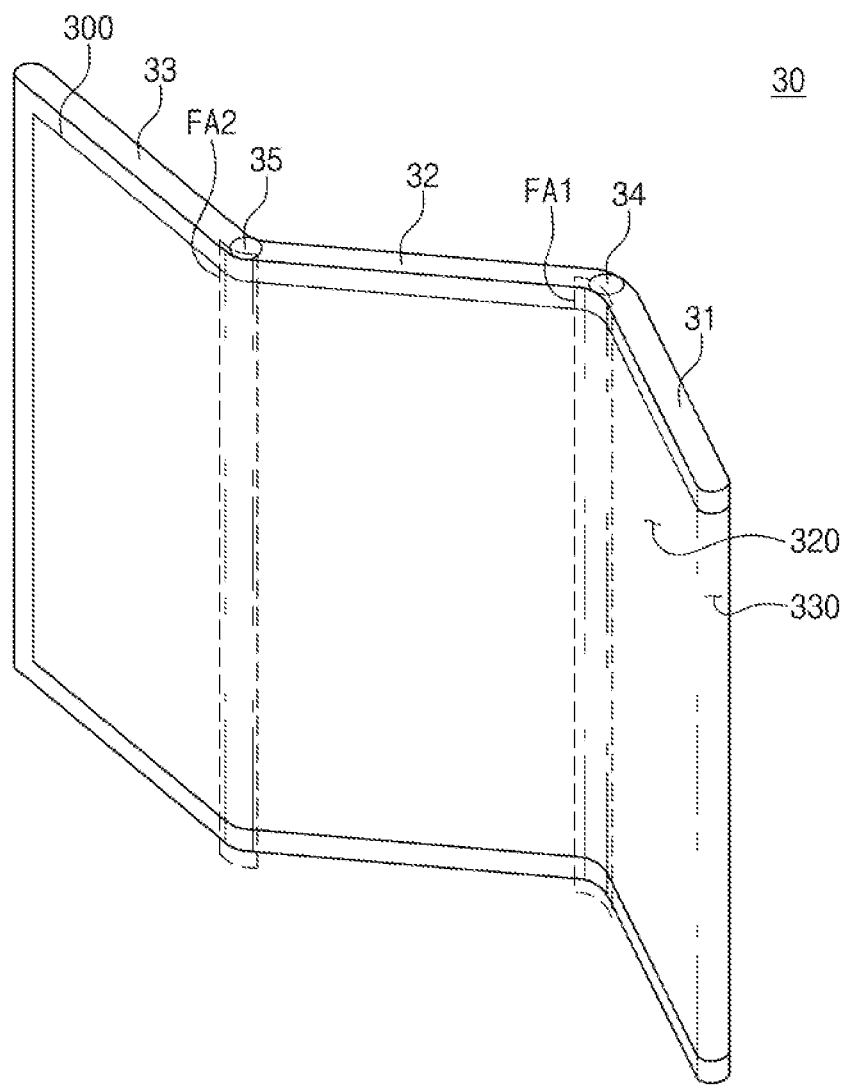
FIGS. 11A to 11C are projection diagrams illustrating an electronic device according to an embodiment of the inventive concept.
Figure 11B:
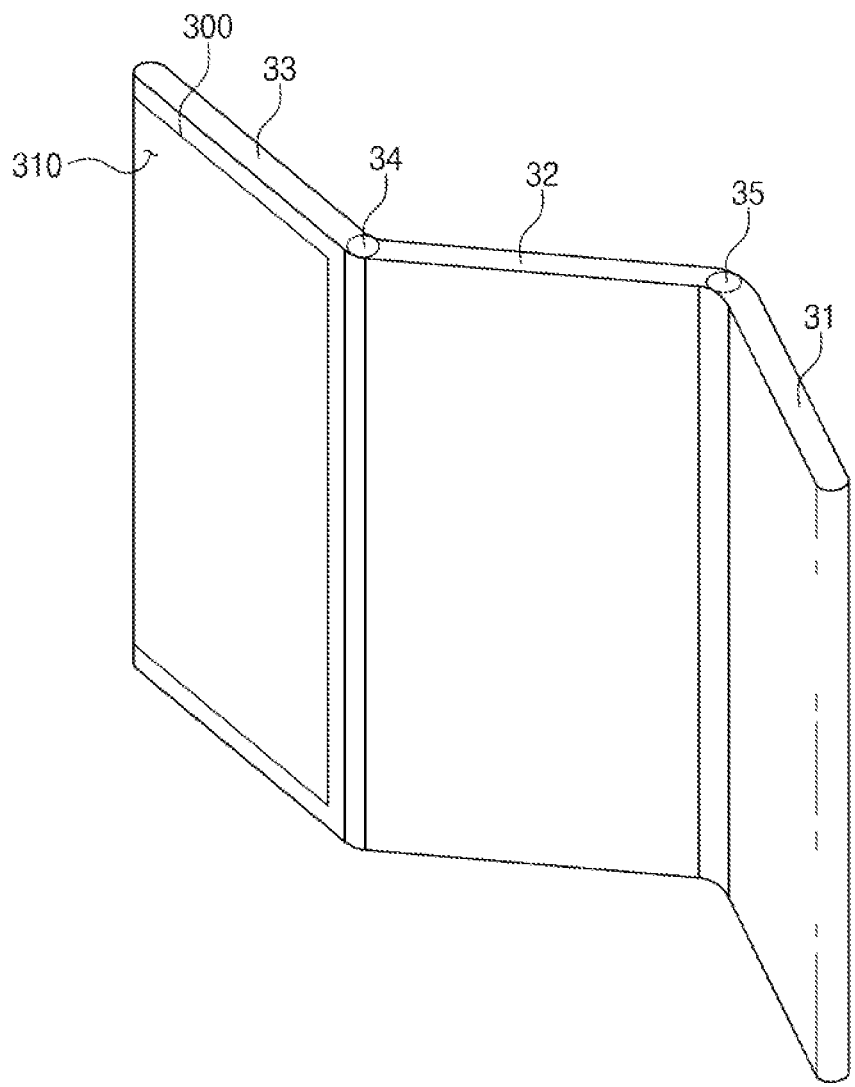
Figure 11C:
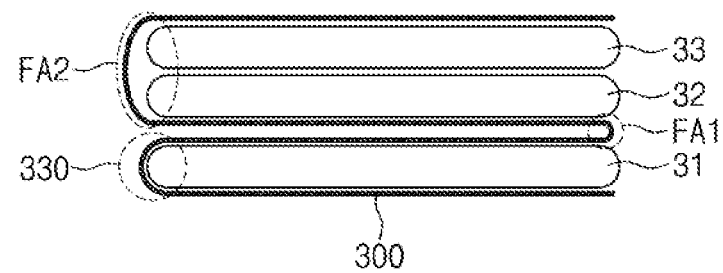

FIGS. 11A to 11C illustrate an electronic device according to an embodiment of the inventive concept. FIG. 11A shows a front perspective view of an electronic device 30, FIG. 11B shows a back perspective view of the electronic device 30, and FIG. 11C shows a top plan view of the electronic device 30 being in a folded state. Referring to FIGS. 11A to 11C, the electronic device 30 may include a first sub-device 31, a second sub-device 32, a third sub-device 33, a first hinge 34, a second hinge 35, and a display panel 300. The first to third sub-devices 31 to 33 may be formed on different printed circuit boards, respectively. The first and second sub-devices 31 and 32 may be connected to each other through the first hinge 34, and the second and third sub-devices 32 and 33 may be connected to each other through the second hinge 35.

The display panel 300 may include a cover area 310, a main area 320, and a round-edge area 330. The main area 320 may be formed on one surface of each of the first, second, and third sub-devices 31, 32, and 33. The cover area 310 may be formed on an opposite surface of the first sub-device 31. The round-edge area 330 may be formed on a side surface of the first sub-device 31 and may be configured to connect the cover area 310 and the main area 320. That is, the cover area 310, the main area 320, and the round-edge area 330 may be formed by one or a single display panel 300.

As illustrated in FIGS. 11A to 11C, the electronic device 30 may be implemented as a Z-folding type corresponding to a combination of an in-folding type and an out-folding type. That is, areas which are formed on the first and second sub-devices 31 and 32, of the main area 320 of the display panel 300 may be folded about a first folding sub-area FA1 to face each other, or inwardly, and areas which are formed on the second and third sub-devices 32 and 33, of the main area 320 of the display panel 300 may be folded about a second folding sub-area FA2 not to face each other, or outwardly. In other words, in the case where the electronic device 30 is in the folded state, the first sub-device 31 may be placed between the cover area 310 and the main area 320 of the display panel 300, at least a portion of the main area 320 may be placed between the first and second sub-devices 31 and 32, and the second and third sub-devices 32 and 33 may be placed between at least two portions of the main area 320.

Figure 12A:
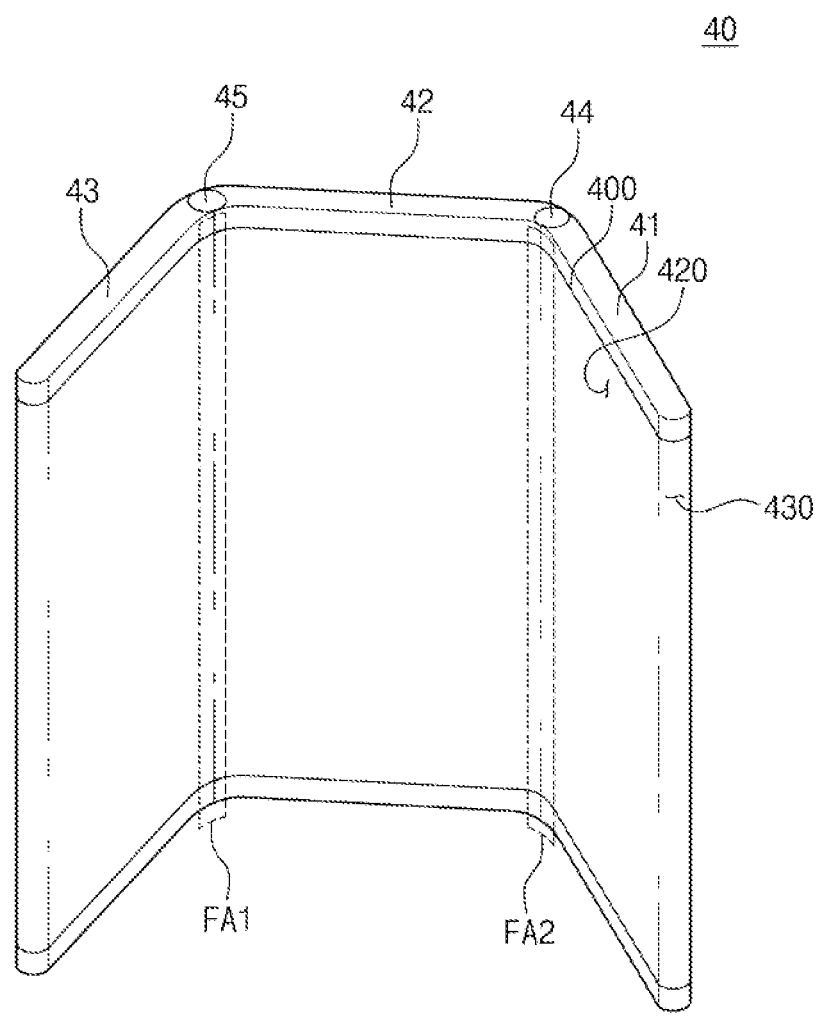
FIGS. 12A to 12C are projection diagrams illustrating an electronic device according to an embodiment of the inventive concept.
Figure 12B:
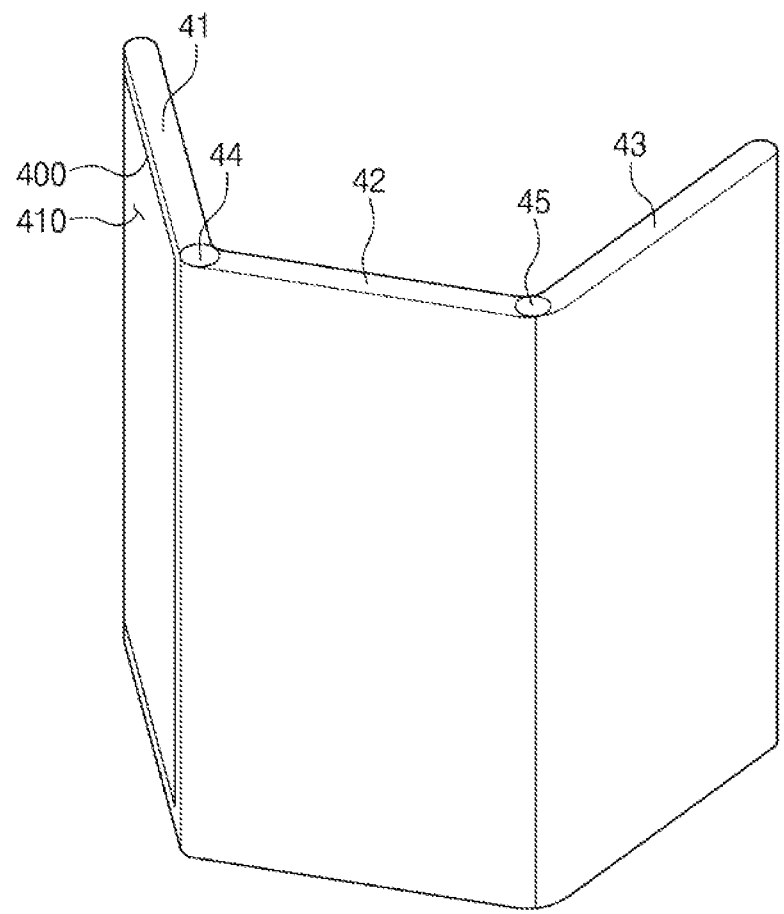
Figure 12C:
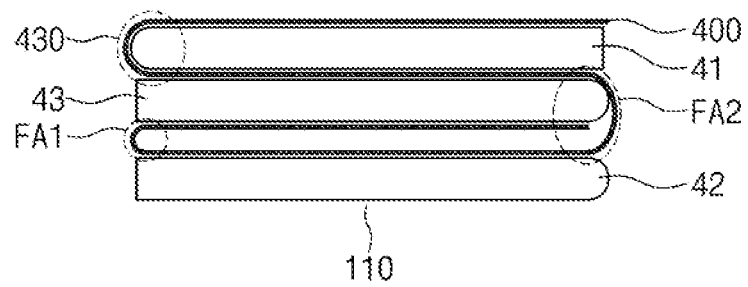

FIGS. 12A to 12C illustrate an electronic device according to an embodiment of the inventive concept. FIG. 12A shows a front perspective view of an electronic device 40, FIG. 12B shows a back perspective view of the electronic device 40, and FIG. 12C shows a top plan view of the electronic device 40 being in a folded state. Referring to FIGS. 12A to 12C, the electronic device 40 may include a first sub-device 41, a second sub-device 42, a third sub-device 43, a first hinge 44, a second hinge 45, and a display panel 400. The first to third sub-devices 41 to 43 may be formed on different printed circuit boards, respectively. The first and second sub-devices 41 and 42 may be connected to each other through the first hinge 44, and the second and third sub-devices 42 and 43 may be connected to each other through the second hinge 45. The display panel 400 may include a cover area 410, a main area 420, and a round-edge area 430.

Unlike the description given with reference to FIGS. 11A to 11C, the electronic device 40 of FIGS. 12A to 12C may use a folding type in which folding is made inwardly at least two times. That is, areas which are formed on the first and second sub-devices 41 and 42 of the main area 420 may be folded inwardly about a first folding sub-area FA1 to face each other, and areas which are formed on the second and third sub-devices 42 and 43 of the main area 320 may be folded inwardly about a second folding sub-area FA2 to face each other.

As described above, an electronic device according to an embodiment of the inventive concept may be configured based on various folding types (e.g., in-folding, out-folding, a combination of in-folding and out-folding, or a plurality of foldings). In this case, in the electronic device according to an embodiment of the inventive concept, a cover area of a display panel is formed on one surface of at least one of sub-devices, and a round-edge area of the display panel is formed on a side surface of the at least one sub-device. Accordingly, a main area configured to support a folding structure, a cover area configured to display information to the outside in a folded state, and a round-edge area configured to connect the main area and the cover area may be implemented with one or a single display panel.

Figure 13:
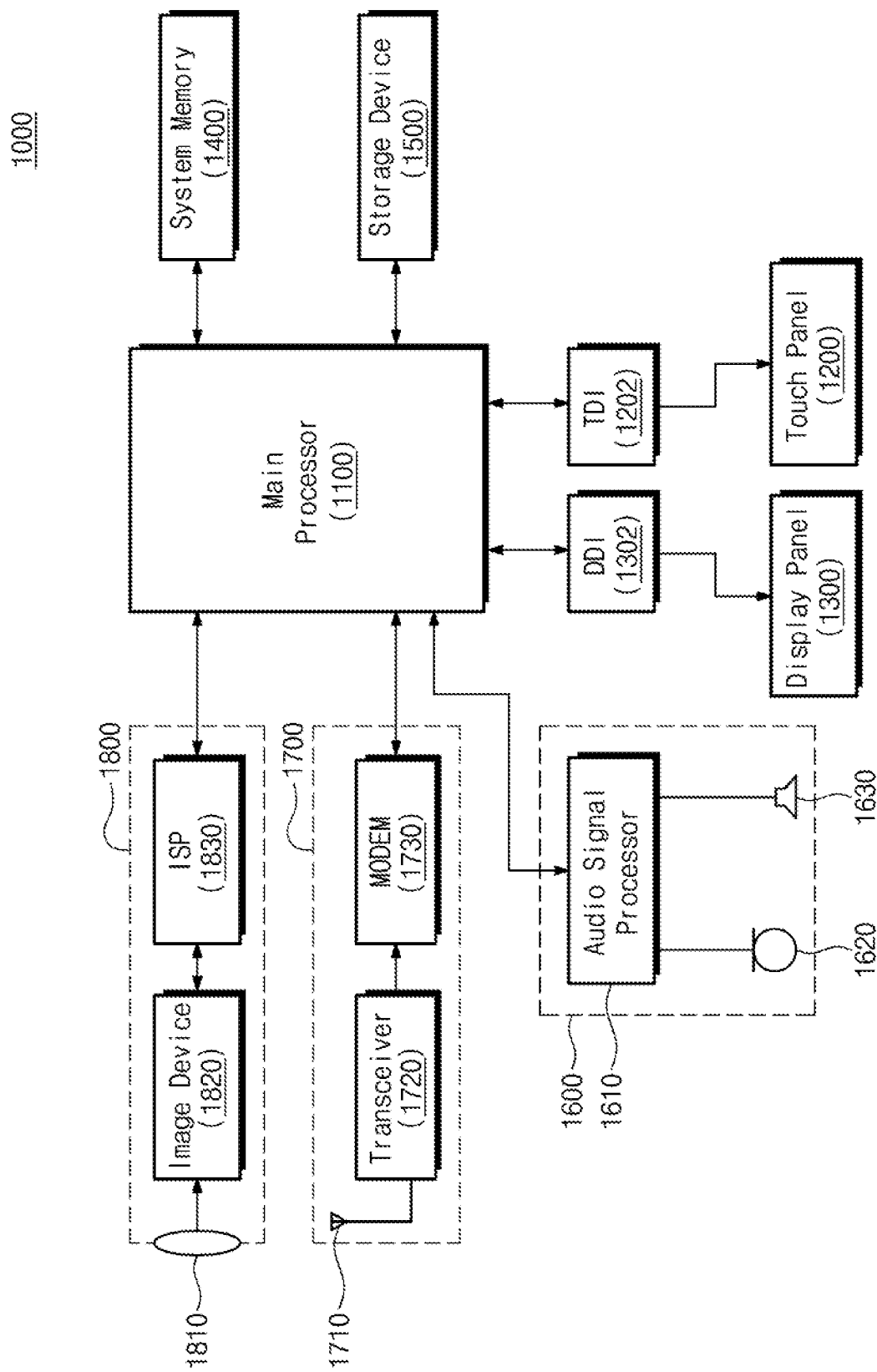
FIG. 13 is a schematic block diagram illustrating an electronic device according to the inventive concept.

FIG. illustrates an electronic device according to an embodiment of the inventive concept. Referring to FIG. 13, an electronic device 1000 may include a main processor 1100, a touch panel 1200, a touch driver integrated circuit 1202 connected between the touch panel and the main processor, a display panel 1300, a display driver integrated circuit 1302 connected between the display panel and the main processor, a system memory 1400 connected to the main processor, a storage device 1500 connected to the main processor, an audio processor 1600 connected to the main processor, a communications block 1700 connected to the main processor, and an image processor 1800 connected to the main processor. In an exemplary embodiment, the electronic device 1000 may be one of various electronic devices such as a portable communications terminal, a personal digital assistant (PDA), a portable media player (PMP), a digital camera, a smartphone, a tablet computer, a laptop computer, a wearable device, or the like.

The main processor 1100 may control overall operations of the electronic device 1000. The main processor 1100 may control/manage operations of the components of the electronic device 1000. The main processor 1100 may process various operations for the purpose of operating the electronic device 1000.

The touch panel 1200 may be configured to sense a touch input from a user under control of the touch driver integrated circuit 1202. The display panel 1300 may be configured to display image information under control of the display driver integrated circuit 1302. In an exemplary embodiment, the electronic device 1000 may be a foldable device described with reference to FIGS. 1A to 12C. The touch panel 1200 and the display panel 1300 may comprise a display panel such as 100 described with reference to FIGS. 1A to 12C, and may be implemented with a single display panel as described with reference to FIGS. 1A to 12C. In an exemplary embodiment, the main processor 1100 may be configured to control the touch driver integrated circuit 1202 and the display driving integrated circuit 1302 as described with reference to FIGS. 1A to 12C.

The system memory 1400 may store data that are used for an operation of the electronic device 1000. For example, the system memory 1400 may include a volatile memory such as a static random access memory (SRAM), a dynamic RAM (DRAM), a synchronous DRAM (SDRAM), and/or a nonvolatile memory such as a Flash Memory, a phase-change RAM (PRAM), a magneto-resistive RAM (MRAM), a resistive RAM (ReRAM), or a ferroelectric RAM (FRAM).

The storage device 1500 may store data regardless of whether a power is supplied. For example, the storage device 1500 may include at least one of various nonvolatile memories such as a flash memory, a PRAM, an MRAM, a ReRAM, and a FRAM. For example, the storage device 1500 may include an embedded memory and/or a removable memory of the electronic device 1000.

The audio processor 1600 may process an audio signal by using an audio signal processor 1610. The audio processor 1600 may receive an audio input through a microphone 1620 or may provide an audio output through a speaker 1630.

The communications block 1700 may exchange signals with an external device/system through an antenna 1710. A transceiver 1720 and a modulator/demodulator (MODEM) 2730 of the communications block 1700 may process signals exchanged with the external device/system in compliance with at least one of various wireless communications protocols such as long term evolution (LTE), worldwide interoperability for microwave access (WiMax), global system for mobile communication (GSM), code division multiple access (CDMA), Bluetooth, near field communication (NFC), wireless fidelity (Wi-Fi), radio frequency identification (RFID), or the like.

The image processor 1800 may receive a light through a lens 1810. An image device 1820 and the image signal processor 1830 included in the image processor 1800 may generate image information about an external object, based on the received light.

According to the inventive concept, a foldable electronic device with improved performance and reduced costs and an operating method thereof are provided.

While the inventive concept has been described with reference to exemplary embodiments thereof, it will be apparent to those of ordinary skill in the pertinent art that various changes and modifications may be made thereto without departing from the scope and spirit of the inventive concept as set forth in the following claims.

What is claimed is:

1. A foldable electronic device comprising:
a first sub-device;
a second sub-device;
a first hinge configured to connect the first and second sub-devices;
a single display panel coupled to the first and second sub-devices, including a main area formed on a first inner surface of the first sub-device and a second inner surface of the second sub-device, a cover area formed on a first outer surface of the first sub-device which faces away from the first inner surface, and an edge area placed on a first side surface of the first sub-device, and configured to connect the main area and the cover area;
a system-on-chip; and
a display driver circuit configured to control the cover area, the main area, and the edge area of the single display panel independently and respectively under control of the system-on-chip,
wherein, in a folded state in which the first and second sub-devices are disposed through the first hinge such that the first and second inner surfaces face each other, first information is displayed through the cover area and the edge area, and
wherein, in an unfolded state in which the first and second sub-devices are disposed through the first hinge such that the first and second inner surfaces are placed on the same plane, second information is displayed through the main area and the edge area,
wherein the display driver circuit includes:
a first display driver configured to control the cover area; and
a second display driver configured to control the main area,
wherein at least one of the first display driver and the second display driver is further configured to control the edge area under control of the system-on-chip.

2. The foldable electronic device of claim 1, wherein the cover area and the edge area are of a rigid type, and the main area is of a flexible type.

3. The foldable electronic device of claim 1, wherein the single display panel further includes:
a first window bonded on the cover area and the edge area; and
a second window bonded on the main area.

4. The foldable electronic device of claim 3, wherein the first window is tempered glass, and the second window is transparent polyimide.

5. The foldable electronic device of claim 1, further comprising:
a side frame formed on the first side surface between the first outer surface and the first inner surface of the first sub-device and configured to surround at least a portion of the edge area.

6. The foldable electronic device of claim 1, wherein the system-on-chip controls the display driver circuit based on user settings and device states.

7. The foldable electronic device of claim 6, wherein, when the user settings and the device states indicate deactivation of the edge area, the system-on-chip is further configured to control the display driver circuit such that the first information is displayed through the cover area in the folded state and the second information is displayed through the main area in the unfolded state, and
wherein, when the user settings and the device states indicate activation of the edge area, the system-on-chip is further configured to control the display driver circuit such that the first information is displayed through the cover area and the edge area in the folded state and the second information is displayed through the main area and the edge area in the unfolded state.

8. The foldable electronic device of claim 1, wherein the single display panel is formed through a single manufacturing process.

9. The foldable electronic device of claim 1, wherein a plurality of first display pixels included in the cover area, a plurality of second display pixels included in the main area, and a plurality of third display pixels included in the edge area share the same data lines.

10. A foldable electronic device comprising:
a first sub-device;
a second sub-device;
a first hinge configured to connect the first and second sub-devices; and
a single display panel coupled to the first and second sub-devices, including a main area formed on a first inner surface of the first sub-device and a second inner surface of the second sub-device, a cover area formed on a first outer surface of the first sub-device which faces away from the first inner surface, and an edge area placed on a first surface of the first sub-device, and configured to connect the main area and the cover area;
a third sub-device; and
a second hinge configured to connect the second sub-device and the third sub-device,
wherein, in a folded state in which the first and second sub-devices are disposed through the first hinge such that the first and second inner surfaces face each other, first information is displayed through the cover area,
wherein, in an unfolded state in which the first and second sub-devices are disposed through the first hinge such that the first and second inner surfaces are placed on the same plane, second information is displayed through the main area,
wherein the main area of the single display panel is further formed on a third inner surface of the third sub-device,
wherein the second sub-device and the third sub-device are disposed through the second hinge.

11. The foldable electronic device of claim 10, wherein a second outer surface of the second sub-device, which faces away from the second inner surface, and a third outer surface of the third sub-device, which faces away from the third inner surface, face each other.

12. The foldable electronic device of claim 10, wherein the second inner surface of the second sub-device and the third inner surface of the third sub-device face each other.

13. The foldable electronic device of claim 6, configured as an in-folding type, further comprising:
   a system-on-chip; and
   a display driver circuit configured to control the single display panel,
   wherein the edge area is configured as a round-edge area which is placed between the cover area and the main area, and
   wherein the display driver circuit is configured to control the cover area and the main area independently and respectively under control of the system-on-chip.

14. The foldable electronic device of claim 13, wherein the main area is not exposed to the outside when the foldable electronic device is in the folded state.

15. The foldable electronic device of claim 13, wherein the display driver circuit includes:
   a first display driver configured to control the cover area; and
   a second display driver configured to control the main area,
   wherein at least one of the first display driver and the second display driver is further configured to control the edge area under control of the system-on-chip.

16. The foldable electronic device of claim 15, wherein the system-on-chip deactivates the second display driver when the foldable electronic device is in the folded state, and deactivates the first display driver when the foldable electronic device is in the unfolded state.

17. An operating method of a foldable electronic device which includes a single display panel having a cover area, a main area, and an edge area, the method comprising:
   selecting one of a plurality of display modes based on at least one of initial settings or received user settings;
   displaying information on the single display panel, based on the selected display mode, through the cover area and the edge area when the foldable electronic device is in a folded state; and
   displaying information on the single display panel, based on the selected display mode, through the main area and the round-edge area when the foldable electronic device is in an unfolded state,
   wherein the cover area indicates an area of the single display panel which is formed on an outer surface of the foldable electronic device and is exposed to an outside environment in the folded state,
   wherein the main area indicates an area of the single display panel which is formed on a plurality of inner surfaces of the foldable electronic device and forms a first plane in the unfolded state, and
   wherein the edge area indicates an area of the single display panel which is formed on at least one side surface of the foldable electronic device and is connected with the cover area and the main area.

18. The method of claim 17, the foldable electronic device further including a display driver circuit configured to control the single display panel,
   wherein the display driver circuit includes a first display driver configured to control the cover area and the edge area; and a second display driver configured to control the main area and the edge area,
   the method further comprising controlling the display driver circuit by deactivating the second display driver when the foldable electronic device is in the folded state, and deactivating the first display driver when the foldable electronic device is in the unfolded state.

19. The method of claim 17,
   wherein the foldable electronic device further includes a system-on-chip, and a display driver circuit controlling the cover area, the main area, and the edge area of the single display panel independently and respectively under control of the system-on-chip.

20. The method of claim 19,
   wherein the display driver circuit includes a first display driver controlling the cover area, and a second display driver controlling the main area,
   wherein at least one of the first display driver and the second display driver is controlling the edge area under control of the system-on-chip.

* * * * *